United States Patent
Mourra

(10) Patent No.: US 9,959,517 B2
(45) Date of Patent: *May 1, 2018

(54) SELF-ORGANIZING NEURAL NETWORK APPROACH TO THE AUTOMATIC LAYOUT OF BUSINESS PROCESS DIAGRAMS

(71) Applicant: INTERNATIONAL BUSINESS MACHINES CORPORATION, Armonk, NY (US)

(72) Inventor: John Mourra, Oakville (CA)

(73) Assignee: International Business Machines Corporation, Armonk, NY (US)

(*) Notice: Subject to any disclaimer, the term of this patent is extended or adjusted under 35 U.S.C. 154(b) by 574 days.

This patent is subject to a terminal disclaimer.

(21) Appl. No.: 14/579,338

(22) Filed: Dec. 22, 2014

(65) Prior Publication Data

US 2016/0180263 A1  Jun. 23, 2016

(51) Int. Cl.
*G06F 3/048* (2013.01)
*G06Q 10/06* (2012.01)
*G06F 3/0481* (2013.01)

(52) U.S. Cl.
CPC ....... *G06Q 10/067* (2013.01); *G06F 3/04817* (2013.01)

(58) Field of Classification Search
CPC .. G06Q 10/067; G06F 10/067; G06F 3/04817
See application file for complete search history.

(56) References Cited

U.S. PATENT DOCUMENTS

| | | | |
|---|---|---|---|
| 5,136,686 A * | 8/1992 | Koza | G06N 3/126 706/13 |
| 6,701,306 B1 * | 3/2004 | Kronmiller | B60T 8/172 707/797 |

(Continued)

OTHER PUBLICATIONS

Meyer, Bernd "Self-Organizing Graphs—A Neural Network Perspective of Graph Layout", published in S.H. Whitesides (Ed.): GD'98, LNCS 1547, pp. 246-262, 1998.*

(Continued)

*Primary Examiner* — Nicholas Augustine
(74) *Attorney, Agent, or Firm* — Law Office of Jim Boice

(57) ABSTRACT

A method, system, and/or computer program product generates self-organizing layouts of process diagrams. Initial weight vectors are distributed uniformly within boundaries of regions in the process diagram. A spatial input vector is randomly generated within the boundaries of each region. In each region in the process diagram, a closest graphical node is found, and a position of a winning graphical node that is the closest graphical node to the random input vector is adjusted. Positions of all non-immutable graphical objects, $w_i$, in a topographical neighborhood N(k) of a closest graphical node $w_c$ that can cross a boundary of one or more regions from the multiple regions are adjusted. The spatial input vector is recursively generated, the closest graphical node is recursively located, and the positions of all non-immutable graphical objects, $w_i$, in the topographical neighborhood N(k) are recursively adjusted until a maximum number of iterations, $k_{max}$ is reached.

12 Claims, 19 Drawing Sheets

(56) References Cited

U.S. PATENT DOCUMENTS

| | | | |
|---|---|---|---|
| 7,093,263 B1* | 8/2006 | Sexton | G06F 9/4435 |
| | | | 714/E11.207 |
| 7,096,445 B1* | 8/2006 | Pucci | G06F 17/5068 |
| | | | 716/119 |
| 8,275,644 B2 | 9/2012 | Cases et al. | |
| 8,527,311 B2 | 9/2013 | Chobantonov et al. | |
| 2002/0051208 A1* | 5/2002 | Venable | H04N 1/387 |
| | | | 358/1.18 |
| 2007/0171716 A1 | 7/2007 | Wright et al. | |
| 2008/0071708 A1 | 3/2008 | Dara et al. | |

OTHER PUBLICATIONS

List of IBM Patents or Patent Applications Treated as Related—Aug. 13, 2015, pp. 1-2.

E. Koua et al., "Geovisualization to Support the Exploration of Large Health and Demographic Survey Data", International Journal of Health Geographics, 2004, vol. 3, No. 12, pp. 1-6.

T. Kohonen, "Self-Organized Formation of Topologically Correct Feature Maps", Springer, Biological Cybernetics, Jan. 1982, vol. 43, No. 1, pp. 59-69. (Abstract Only).

B. Meyer, "Self-Organizing Graphs—A Neural Network Perspective of Graph Layout", Springer, Lecture Notes in Computer Science, vol. 1547, 1998, pp. 246-262. (Abstract Only).

B. Meyer, "Competitive Learning of Network Diagram Layout", IEEE, IEEE Symposium on Visual Languages, 1998, pp. 56-63. (Abstract Only).

Anonymous, "Self-Organizing Map", Wikimedia Foundation, Inc., wikipedia.org, last modified Dec. 18, 2014, retrieved Dec. 22, 2014, pp. 1-6.

E. Turban et al., "Online Chapter 6: Neural Networks for Data Mining", Business Intelligence: A Managerial Approach, Pearson Prentice Hall, 2008, pp. 1-40.

S. White, "Introduction to BPMN", Object Management Group, Inc., www.omg.org, Oct. 16, 2006, pp. 1-11.

P. Effinger et al., "Improving Proces Visualizations", Wilhelm-Schickard-Institute (WSI) for Informatics, WSI-2009-02, 2009, pp. 1-12.

SAS Institute Inc., "Data Mining Using SAS Enterprise Miner: a Case Study Approach, Second Edition", SAS Institute Inc, Cary, NC, USA, 2003, pp. 1-134.

M. Babar et al., "Business Trends Discovery in Databases Using Self Organizing Maps", IJSSST vol. 9, No. 4, Nov. 2008, pp. 1-7.

* cited by examiner

SELF-ORGANIZING NEURAL NETWORK APPROACH TO THE AUTOMATIC LAYOUT OF BUSINESS PROCESS DIAGRAMS

BACKGROUND

The present disclosure relates to the field of computers, and specifically to the user of computers in implementing business process diagrams. Still more particularly, the present disclosure relates to improving layout and readability of business process diagrams.

SUMMARY

In one or more embodiments of the present invention, a method, system, and/or computer program product generates self-organizing layouts of process diagrams. Initial spatial position vectors, $w_i$, are randomly selected for all graphical nodes in a process diagram. The initial spatial position vectors, $w_i$, are distributed uniformly within boundaries of the respective regions in the process diagram. In each region in the process diagram, a spatial input vector, x, is randomly generated within the boundaries of each region. In each region in the process diagram, a closest graphical node, $w_c$, to a random input vector is found. in each region in the process diagram, adjusting a position of a winning graphical node that is the closest graphical node to the random input vector generated in said each region. A weight vector of each immutable closest graphical node is adjusted, where each immutable closest graphical node $w_c$ has a fixed location on the process diagram. Positions of all non-immutable graphical objects, $w_i$, in a topographical neighborhood N(k) of a closest graphical node $w_c$ that can cross a boundary of one or more regions from the multiple regions are adjusted. The spatial input vector $x_i$ is randomly regenerated recursively, the closest graphical node $w_c$ is found recursively, the position of the winning graphical node is adjusted recursively, the position of the immutable closest graphical node $w_c$ is adjusted recursively, and positions of all non-immutable graphical objects, $w_i$, in the topographical neighborhood N(k) are adjusted recursively until a maximum number of iterations, $k_{max}$ is reached.

DETAILED DESCRIPTION

Figure 1:
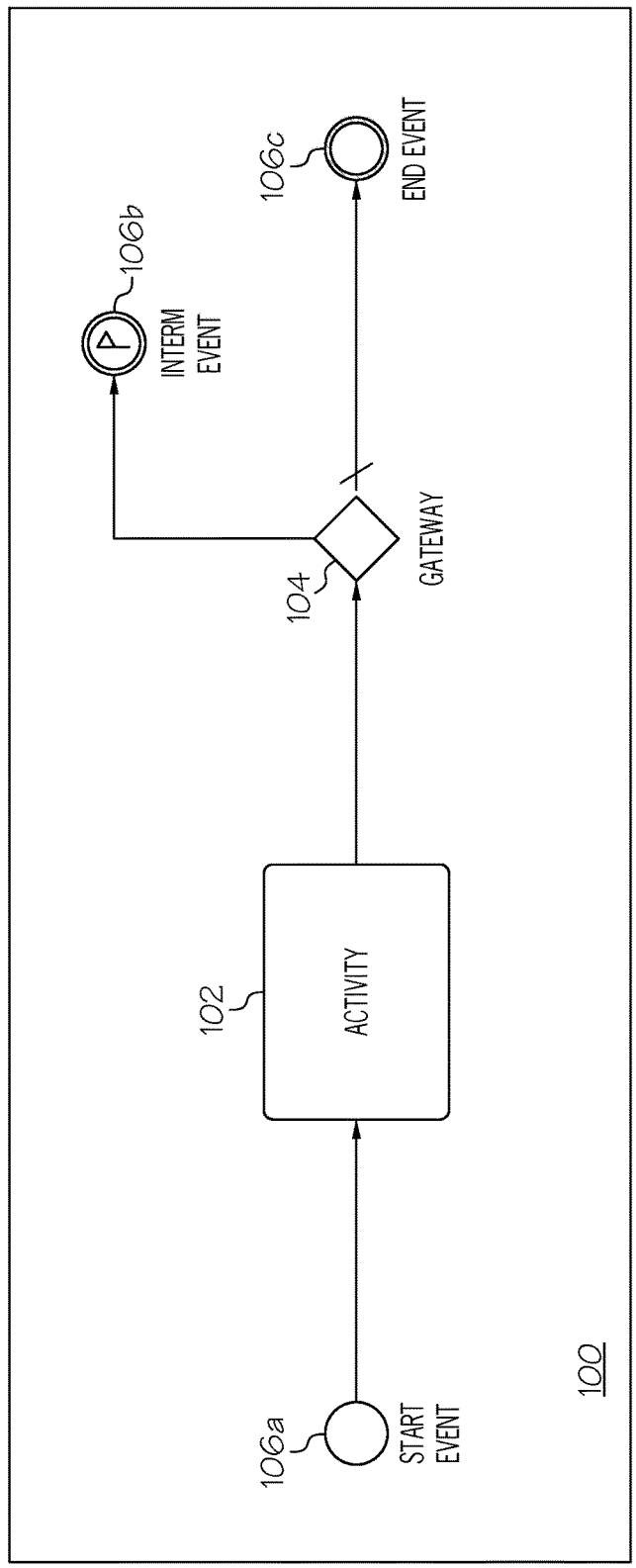
FIG. 1 depicts basic building blocks of a Business Process Model and Notation (BPMN) business process diagram.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

I. INTRODUCTION

Business Process Management (BPM) is a discipline that treats an organization's processes as critical business assets that must be managed as such. It provides a structured framework for modeling, controlling, analyzing, monitoring, optimizing, and improving processes. It seeks to improve business insight, and in turn business outcomes, by increasing an organization's visibility of the inner workings of its processes.

Business processes are modeled and represented graphically in the form of Business Process Diagrams (BPDs), commonly described using the standard Business Process Model and Notation (BPMN) specification. A variety of BPM vendors offer products with visual tools to create and manipulate BPDs. One such vendor offers a BPM suite which includes a Process Designer, which enables the visual modeling and manipulation of BPMN-based business processes.

Process diagrams represent the processes that drive businesses, and as such, they reflect the size and complexity of these processes. As these process diagrams grow to represent the complexities of real-world processes, they become unwieldy and hard to read by a human. Yet, business success depends on properly modeled processes that can be easily read, understood, and modified as the business reacts to changing demands.

Known prior art does not teach the addition of automatic layout to a Process Designer to improve the visualization and readability of large process diagrams, especially in cases where the diagram was processor-generated (rather than created manually). Such a feature has not been incorporated into the layout, mainly due to the complexity and computationally-intensive nature of BPMN layout algorithms.

This present invention provides a solution to this problem through the use of a new and nonobvious connectionist modeling approach, thus achieving an efficient business process diagram automatic layout. In one or more embodiments and as described herein, the present invention casts business process diagrams as self-organizing maps.

II. OVERVIEW OF BPMN

Business Process Model and Notation provides a simple, yet flexible, notation that can be easily understood by business analysts who model and manage business processes. It defines a set of graphical elements that resemble the building blocks of a flowchart diagram. For the sake of simplicity and understandability, the core graphical objects that make up the nodes of a flow are limited to three main types, as shown in graph 100 in FIG. 1, that are connected with directional arrows referred to as sequence flows: activities 102; gateways 104, and events 106.

Activities 102 denote logical units of work, and are preferably represented by a rounded-corner rectangle.

Gateways 104 denote decision points, joins, or splits in the flow, and are preferably represented by a diamond shape.

Events 106 denote occurrences that trigger or are triggered by something in the process, and are preferably represented by circles. Events 106 include start events (e.g., start event 106a) that trigger the beginning of the process (represented as a single circle), intermediate events (e.g., intermediate event 106b) in the middle of a process (represented as a double circle), and end events (e.g., end event 106c) that are final nodes in the flow of a process (represented by a bold single circle).

Figure 2:
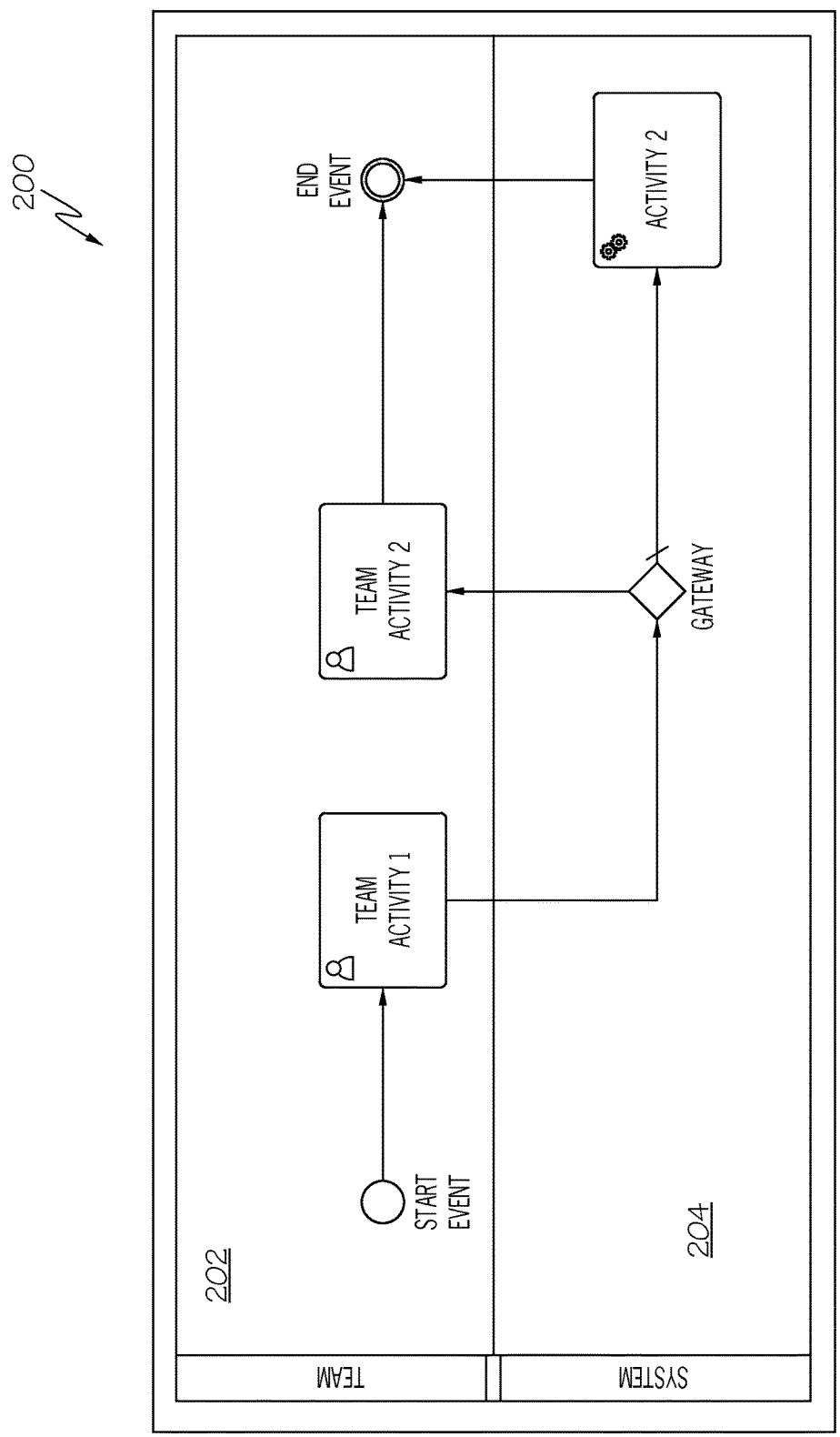
FIG. 2 illustrates a sample Business Process Management (BPM) process diagram with swimlanes.

The graphical elements shown in FIG. 1 are used to assemble business processes that may be distributed across swimlanes, which is a useful organizational construct in BPMN Business Process Diagrams. They represent separate visual regions of the diagram that are independent of one another in the layout but still include nodes that are interconnected across their boundaries. Such graphical elements can also be used to separate activities based on functions or roles, including where such activities cross swimlanes. For example, consider graph 200 in FIG. 2, which depicts a sample process distributed across two swimlanes (swimlane 202 and swimlane 204).

III. OVERVIEW OF NEURAL NETWORKS

Borrowing from the design of the human brain, connectionist modeling techniques aim to tap into the powerful capabilities of a highly interconnected network of neurons to build systems that can learn. The nodes of these networks are attached to one another with weighted connections. The training (or learning) phase of these networks involves adjusting the weights of each of the connections based on either a comparison of the network's output with the expected output (supervised learning), or the independent recognition of similarities in the inputs (unsupervised learning). Such a network is referred to as an artificial neural network (ANN).

One type of ANN is referred to as a Kohonen Self-Organizing Map (KSOM), which belongs to the class of unsupervised neural networks that are trained through competitive learning, where nodes compete with one another to be activated (and hence, their connection weights strengthened) by a particular input, resulting in the recognition of similarities in inputs. In essence, these networks determine by themselves what the ideal connection weight optimization criteria are based on patterns in the inputs, without the aid of an external objective function or external trainer.

IV. KOHONEN'S SELF-ORGANIZING MAP

The physical location of neurons and their spatial relationship to other neurons in the brain play an important role in the processing of input stimuli across different neighborhoods of the brain. In other words, the topography of the brain is important. Neurons that handle similar sensory stimuli (e.g., visual, auditory, etc.) benefit from close proximity to one another to ensure short synaptic connections. Inspired by this neurobiological notion, the Kohonen Self-Organizing Map (KSOM) is a network that maps multi-dimensional input stimuli to a spatially distributed, usually two-dimensional, network of output nodes such that similar input pattern characteristics excite nodes that are in close physical proximity.

Figure 3:
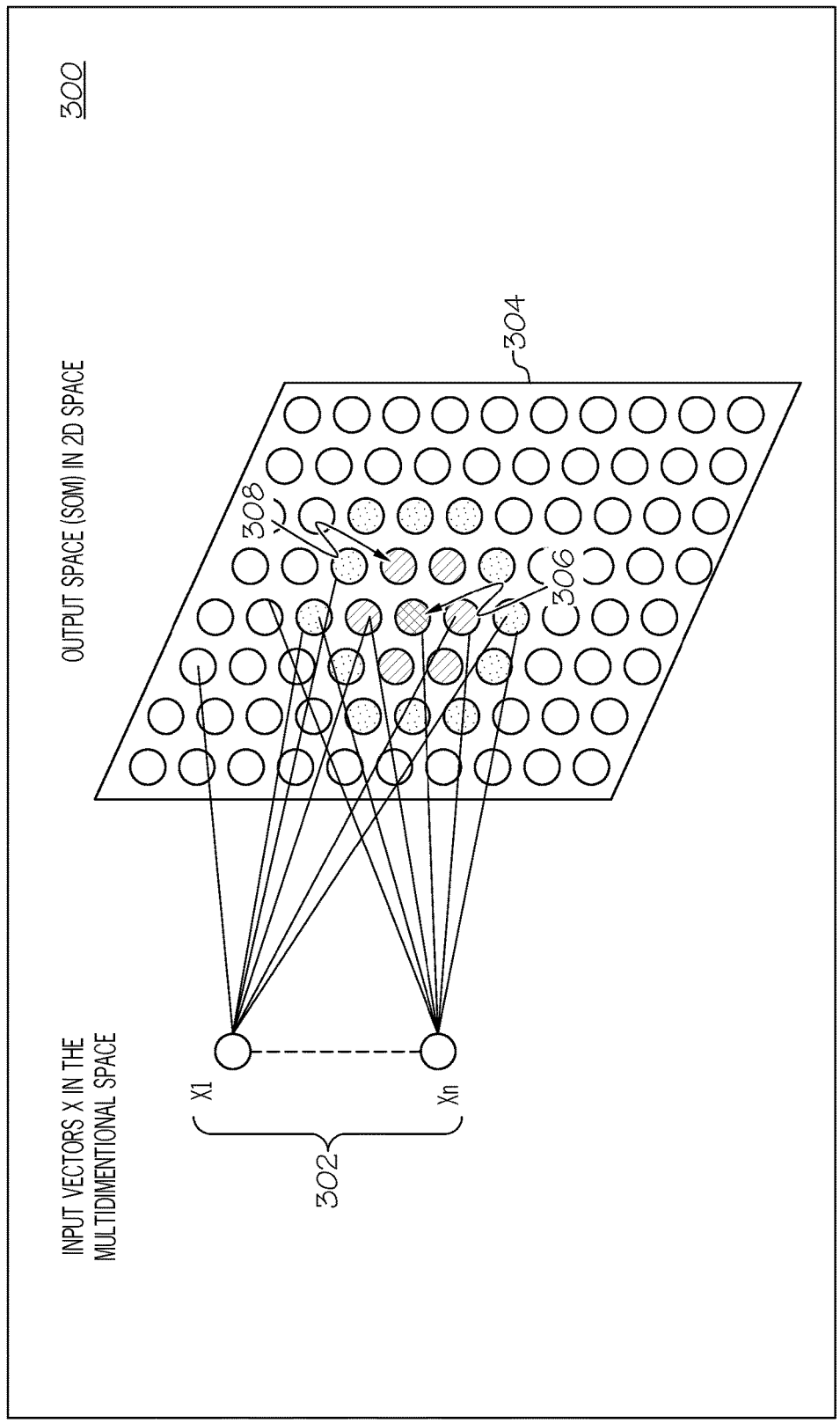
FIG. 3 depicts a structure of a two-dimensional Self-Organizing Map.

The network is composed of two layers, an input layer composed of one node per dimension of the input data, and an output layer composed of a specified number of output units (e.g. clusters) to reduce the input space to. Every node in the input layer is connected to every node in the output layer, and every connection has a weight. For example, FIG. 3 presents a schematic representation of a 2D KSOM 300. Note that only a subset of input-output connections (i.e., input vectors 302 and output space nodes 304) is shown for readability in FIG. 3.

Learning in a KSOM is of the unsupervised, competitive form. Output nodes compete to be the winner for a particular input. For example, output node 306 shown in FIG. 3 is the "winning node" for input vector $X_n$. The connections between the input vector (e.g., input vector $X_n$) and its winning output node (e.g., output node 306) are strengthened by increasing their connection weights. Neighboring output nodes (e.g., output node 308) also experience strengthening of connection weights, but to a lesser extent than the winning node (output node 306). The effect of the weight adaption diminishes as the distance from the winning node increases and as the number of learning iterations increases.

This learning algorithm as adapted by one or more embodiments of the present invention can be characterized as follows. Given an input vector x and a weight vector $w_i$ connecting the input elements of x to the output node $n_j$ (i.e. the node at position i in the lattice of output nodes):

1) Randomly select initial weights for all weight vectors $w_i$;
2) Provide an input vector x to the network;
3) Find the winning output node $n_c$, by minimizing the Euclidian distance between x and $w_i$, such that:

$$\|x-w_c\|=\min_i\|x-w_i\|$$

4) Adjust the weight vector of the winning node, $n_c$, and the weight vectors of all nodes in the iteration-specific neighborhood, N(k) surrounding $n_c$, according to the function:

$$\Delta w_i=\alpha(k)h(n_c,n_i)[x-wi], \; n_i\epsilon N(k)$$

where: $\alpha(k)$ is an adaption rate (with a value between 0 and 1) that diminishes with every iteration k;

$h(n_c, n_i)$ is a neighborhood function (with a value between 0 and 1) that diminishes as the topographical distance (manhattan distance on the lattice) increases between the winning node and the node in the neighborhood i and i defines the neighborhood boundary during an iteration k and decreases over the span of the iterations, such that $n_i\epsilon N(k)$ refers to every k iteration of output nodes n in the neighborhood N(k).

5) Repeat steps 2-4 until the maximum number of iterations is reached or the weight adaption rate drops below a certain threshold.

Note that in the KSOM learning algorithm, the criterion for determining the winning node does not require the computation of the output responses of the nodes. It is simply based on the distance between the input nodes and the weights of the connections to the output nodes, which was shown by Kohonen to be a sufficient indicator of relative output response. This will serve as a key point to enable the paradigm shift towards modeling graphical diagrams as self-organizing networks.

V. INVERTED SELF-ORGANIZING MAP

With the Kohonen self-organizing learning algorithm established, the present invention utilizes an inversion to view an interconnected graph of nodes as an "inverted" self-organizing map (ISOM). This inversion ignores the output neurons and instead focuses only on the output weights, interpreting them as vectors in Cartesian space that describe the locations of graphical nodes. With this inversion, a graph becomes self-organizing and weight optimization (i.e. layout optimization) becomes the goal of the network, rather than just a learning phase. The network's intended purpose becomes the result of its learning phase, and after the fact, the network is never used in the traditional sense to compute an output response.

Network training requires input data, and it may not be immediately obvious what the input data is in a graph layout problem. Kohonen shows that a self-organizing network will stretch to uniformly fill the input space, and based on this, the inversion shows that it is sufficient to use a randomly distributed set of points inside the graph's boundaries as input stimuli. This will result in a layout that fills the available space and provides for an input set independent of the graph to be laid out.

VI. SELF-ORGANIZING BUSINESS PROCESS DIAGRAMS

In accordance with one or more embodiments and/or illustrative examples of the present invention, a specific case of Business Process Diagrams is now presented. According to the present invention, an efficient automatic layout of process diagrams is achieved by applying the KSOM technique in its inverted ISOM form and adding specialized extensions to the self-organizing network structure and learning algorithm to account for directional flow and independent, yet interconnected, layout regions.

In accordance with one or more embodiments of the present invention, the diagram itself is modeled as a self-organizing map. The nodes in the diagrams are modeled as the interconnected neurons that make up the output layer. The wiring between the graphical objects in the diagram dictate the topological proximity of the nodes in the map, while the weight vectors of the nodes in the map dictate the physical location of the graphical objects in the diagram. In other words, adapting a node's weight vector is equivalent to moving the graphical object within the diagram. The input training data is a randomly generated set of points uniformly distributed in the selected layout area.

As described above, a process diagram may be distributed across multiple regions, referred to as swimlanes. These separate regions require independent layout of the objects within them. However, each region cannot be considered a completely separate entity during layout, because objects within one region can be connected to objects within other regions. This interconnection with other objects is interpreted as a topological one and hence must be factored in the learning algorithm, such that it locally influences each of the regional layouts in order to achieve an optimized global layout spanning multiple regions. To achieve this, weight-constrained regions in the self-organizing map structure extend the competitive learning algorithm such that, during each iteration, one input vector per region is selected and presented to the network in its respective region. The winning node for each input vector is selected only from the region that receives that input vector. However, the neighborhood of adapted nodes is allowed to cross regional boundaries. The adaptive effect on node weights (i.e., the effect on physical locations of graphical objects) is constrained to the weight-space boundaries of the region the node belongs to (i.e. the physical borders of the graphical region in the diagram). This ensures that objects do not move out of their respective regions in the diagram, while at the same time allowing them to influence the location of objects in other regions.

Another feature of process diagrams is their directionality. They have a start event and an end event, and they generally flow sequentially between them, with a variety of loops, joins, and splits in between. By nature, the self-organizing graph technique does not account for directionality, but instead unfolds a network of nodes dynamically to achieve optimized topological symmetry balanced with uniform distribution within the layout space. To impose directional influence on the graph's layout, the present invention introduces the notion of immutable nodes in the self-organizing map structure.

These nodes participate in the competitive process like every other node in the network, except that their weight vector is immune to adaption (i.e., their physical location in the diagram is fixed). Their initial weight vectors are also not randomly generated. Instead, they are pre-set at the onset of the training algorithm. This means that during automatic layout of a process diagram, the graphical objects corresponding to these immutable nodes are not affected and remain fixed at the location where a user places them in the diagram. This immutability of specific nodes produces a constraining effect on the network's topology, resulting in a layout with directional flow consistent with the intent of the diagram's creator.

Incorporating the basic KSOM learning algorithm, the ISOM perspective, and the present invention's extensions to the self-organizing map structure, the enhanced learning algorithm used to implement the self-organizing layout of business process diagrams is described by implementing the following process. Given a diagram with multiple regions and interconnected graphical nodes distributed within those regions:

1) Randomly select initial spatial position vectors, $w_i$, for all graphical nodes in the diagram, and distribute them uniformly within the boundaries of their respective regions;

2) In each region, randomly generate a spatial input vector (e.g., one dimensional vector—a point), x, within the boundaries of that region;

3) In each region, find the closest graphical node, $w_c$, to the random input vector generated in that region, by minimizing the Euclidean distance between x and $w_i$ such that:

$$\|x - w_c\| = \min_i \|x - w_i\|$$

4) In each region, adjust the position of the winning graphical node, $w_c$, if it is not immutable. Also, adjust the positions of all non-immutable graphical nodes, $w_i$, in the winning node's topographical (i.e., interconnected) neighborhood N(k) which can cross the region's boundary. The spatial adjustment of the spatial position weight vectors is calculated as follows:

$$\Delta w_i = \alpha(k) h(n_c, n_i)[x - wi], \; n_i \in N(k)$$

In one or more embodiments of the present invention, graphical objects are never moved out of their respective regions. If the spatial adjustment, $\Delta w_i$, attempts to move an object beyond its region's boundary, its movement should stop at the boundary.

For example, for $$w_{i_{k+1}} = w_i + \Delta w_i = (w_{i_{k+1}x}, w_{i_{k+1}y})$$

contained in a 2D rectangular region R:

if $w_{i_{k+1}x} > x_{max}^R$ then $w_{i_{k+1}x} = x_{max}^R$ if $w_{i_{k+1}x} < x_{min}^R$ then $w_{i_{k+1}x} = x_{min}^R$ if $w_{i_{k+1}y} > y_{max}^R$ then $w_{i_{k+1}y} = y_{max}^R$ if $w_{i_{k+1}y} < y_{min}^R$ then $w_{i_{k+1}y} = y_{min}^R$ 5) Repeat steps 2-4 until the maximum number of iterations ($k_{max}$) is reached or the weight adaption rate drops below a certain threshold.

The adaption function, $\alpha(k)$, and the neighborhood function, $h(n_c, n_i)$ are selected by:

$$\alpha(k) = \alpha_{max} e^{-c\left(\frac{k}{k_{max}}\right)}$$

where $\alpha_m$ is a maximum adaption parameter (between 0 and 1), and c is a cooling parameter that determines the rate of decline in the adaption rate.

A topical distance to the winning node, $n_c$, is established by:

$$h(n_c, n_i) = \begin{cases} \frac{1}{2^{d(n_c, n_i)}}, & n_i \in N(k) \\ 0, & n_i \notin N(k) \end{cases}$$

where $d(n_c, n_i)$ is the topographical (manhattan) distance between the winning node, $n_c$, and its neighboring node $n_i$ (i.e. the number of connections in the shortest path between them).

N(k) is characterized by a radius, r, that denotes the maximum number of connections in the path between two nodes considered to be in the same neighborhood. This radius starts at a pre-selected $r_{max}$ and is reduced by 1 at a pre-selected $k_r$ interval, until it reaches a pre-selected $r_{min}$.

VII. EXPERIMENTAL EVALUATION

A prototype of this self-organizing layout algorithm for business process diagrams was implemented successfully in IBM's Process Designer (v8.5), a visual modeling application for designing BPMN-based business processes that is part of IBM's BPM product offering.

In order to visualize the newly implemented auto-layout feature, the following example run is presented. Consider the, deliberately poorly formatted, multi-region process diagram 400 in FIG. 4, which shows a sample 3-lane 14-node process diagram before auto-layout.

Figure 4:
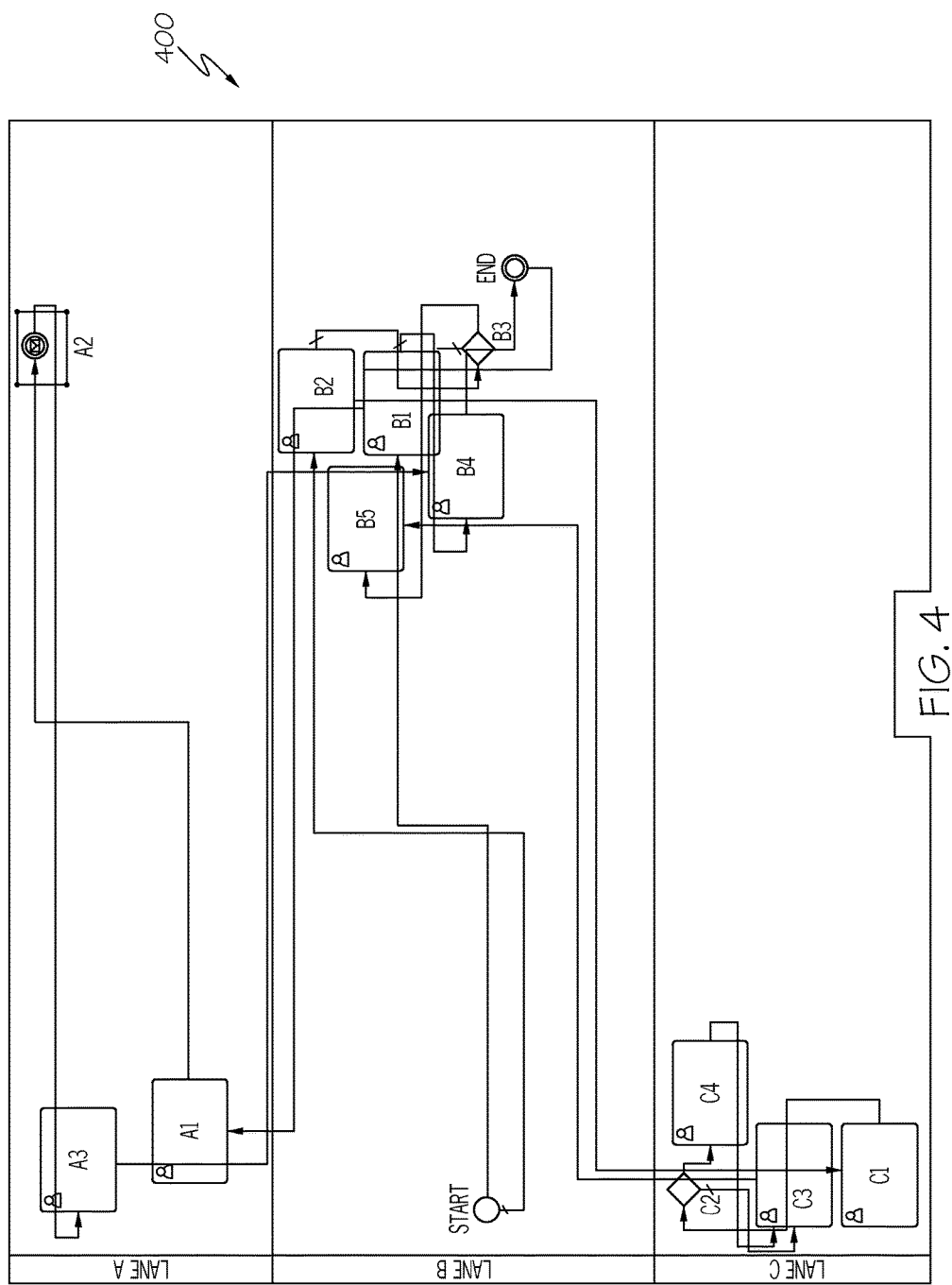
FIG. 4 illustrates a sample 3-lane 14-node process diagram before auto-layout using one or more inventive processes described herein.
Figure 5:
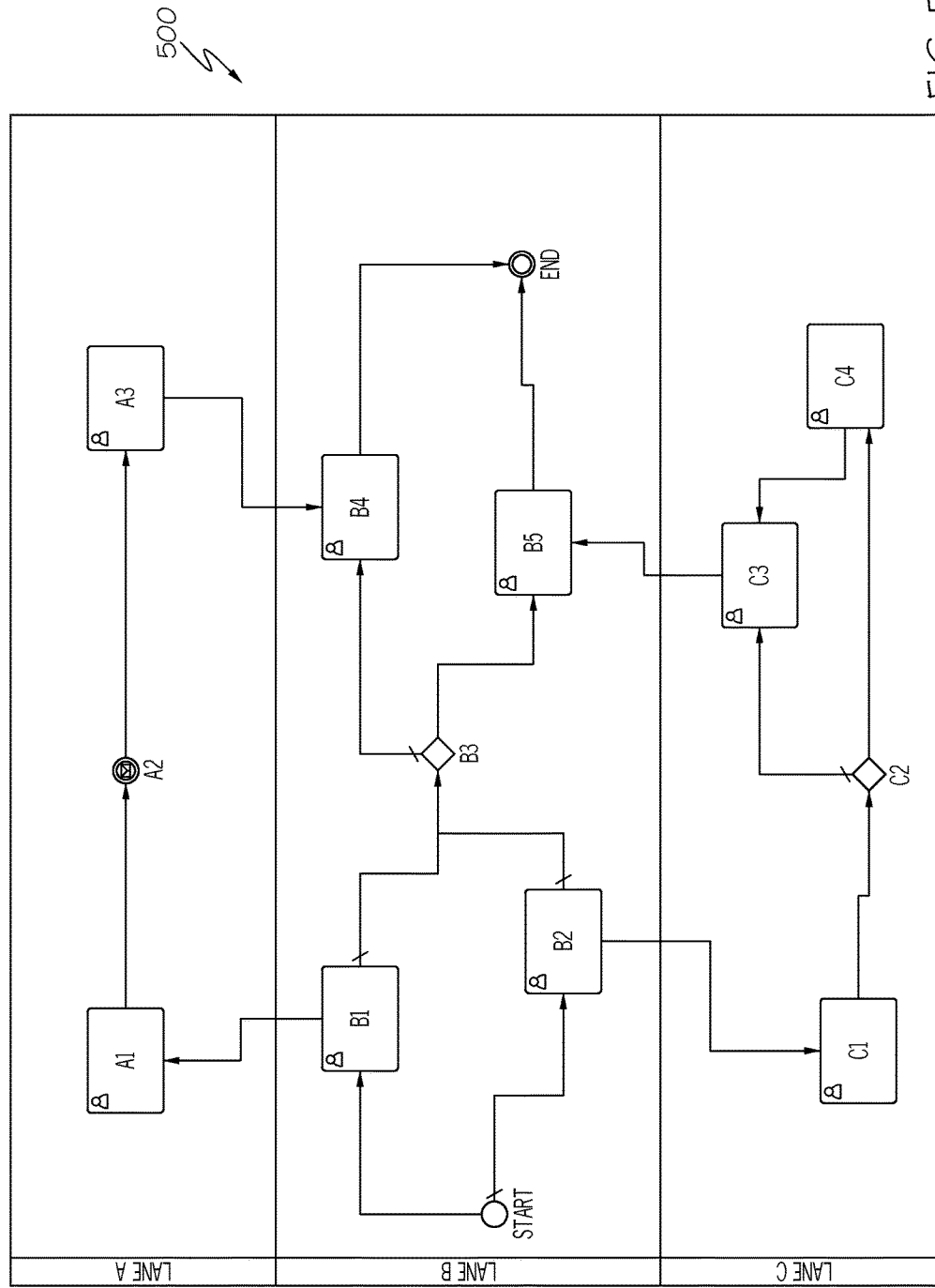
FIG. 5 depicts the process diagram from FIG. 4 after auto-layout.

After triggering the newly added auto-layout process described above to the diagram application (in order to adjust process diagram 400), the process diagram 400 in FIG. 4 changes to what is shown in FIG. 5 as diagram 500. Diagram 500 presents a symmetry and directionality that is not found in process diagram 400.

After the algorithm was implemented, optimal parameters are determined based on an experimental analysis. The neighborhood radius reduction interval ($k_r$) is a useful parameter. A large portion of the adaption occurs when r=1 (i.e., when only the winning node and immediately connected nodes are being adapted). Furthermore, the adaption rate can be limited when r=0 (i.e., when only the winning node is being adapted), since adaption of single nodes in isolation has the potential of reducing the symmetry of the diagram.

Based on this, the following parameter values were selected after multiple variations were assessed experimentally as being optimal ("best mode") values:

Maximum iterations: $k_{max}$=500
Radius reduction interval: $k_r$=125
Maximum and minimum neighborhood radii: $r_{max}$=3, $r_{min}$=0
Maximum adaption rate: $\alpha_{max}$=0.8
Adaption cooling factor: c=2

Furthermore, to enforce directionality, all start and end event nodes are designated as immutable. Also, each swimlane in the diagram is designated as a weight-constrained region in the self-organizing network.

Auto-layout is performed on a variety of different process diagram configurations, with variations in structure and size, to assess the effectiveness and efficiency of this self-organizing approach. Selected findings of interest are discussed below.

A. Uniform Distribution Within Regional Boundaries

The allowed layout space can be set by the user by modifying the size of regions in the diagram. It is noted that the automatic layout algorithm effectively honors this space restriction while maximizing the use of the space allowed.

Figure 6:
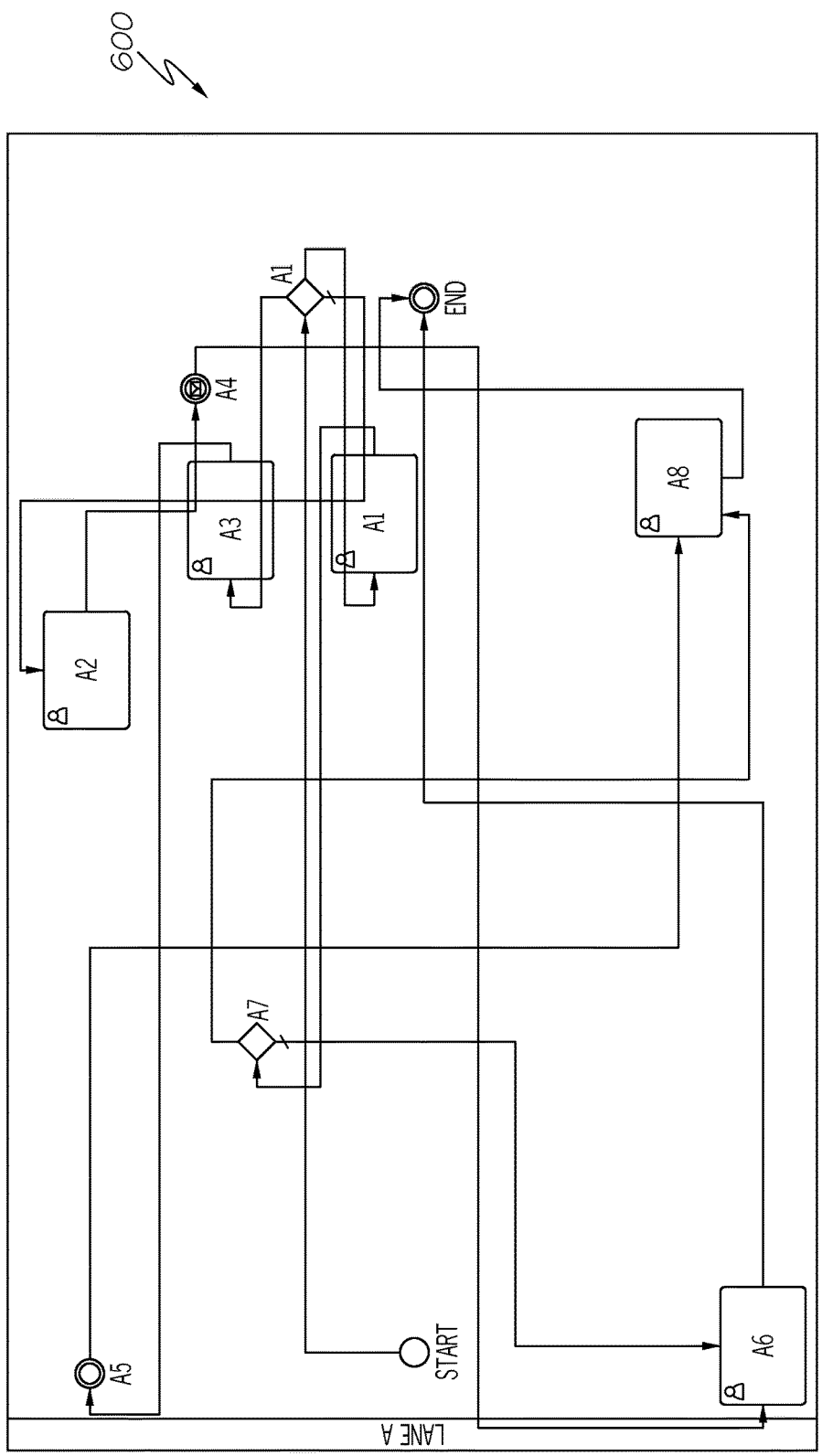
FIG. 6 illustrates a 1-lane 11-node process diagram before auto-layout.

FIG. 6 shows a 1-lane 11-node process diagram 600 with a set lane size.

Figure 7:
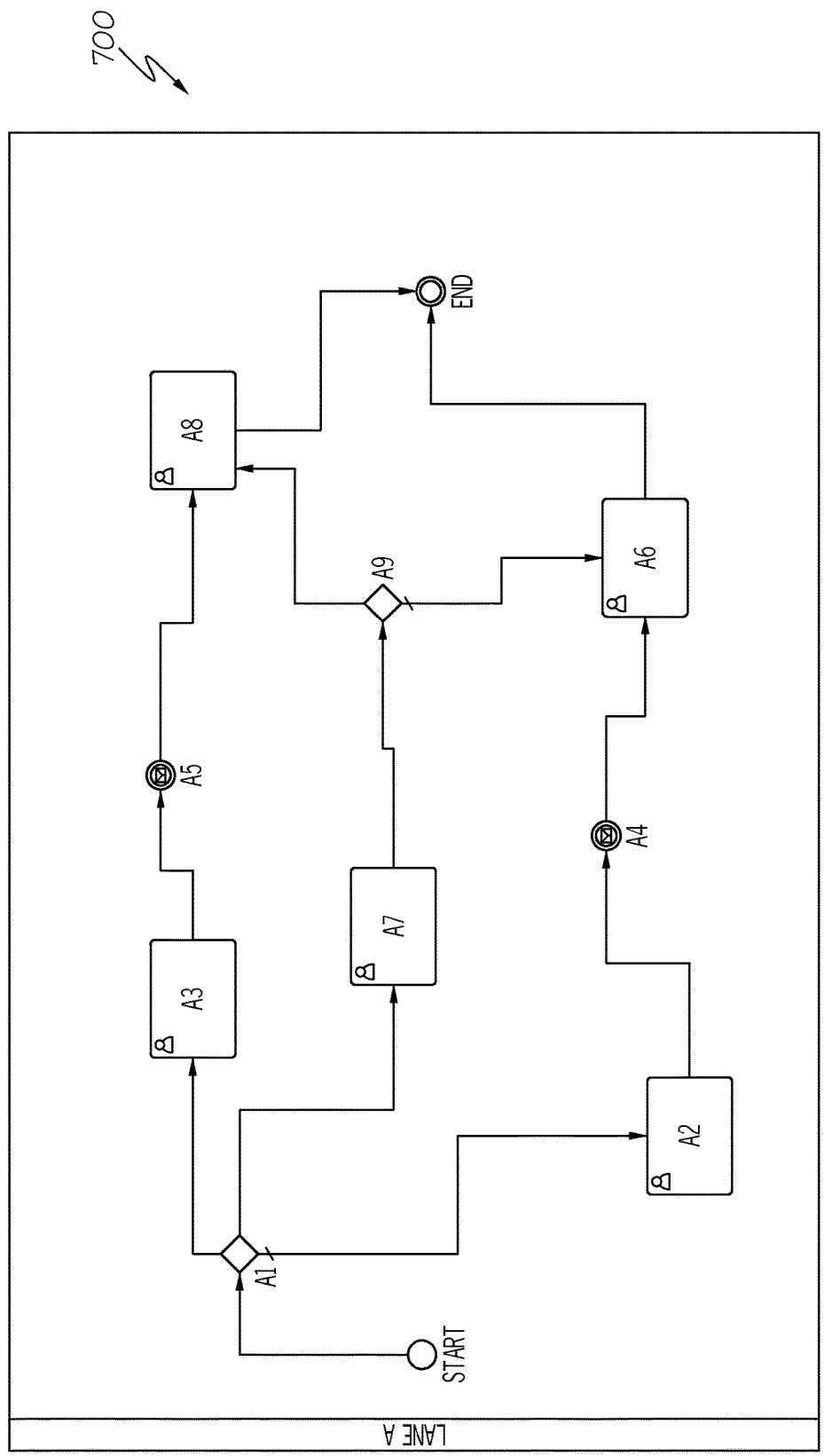
FIG. 7 depicts the process diagram from FIG. 6 after auto-layout.
Figure 8:
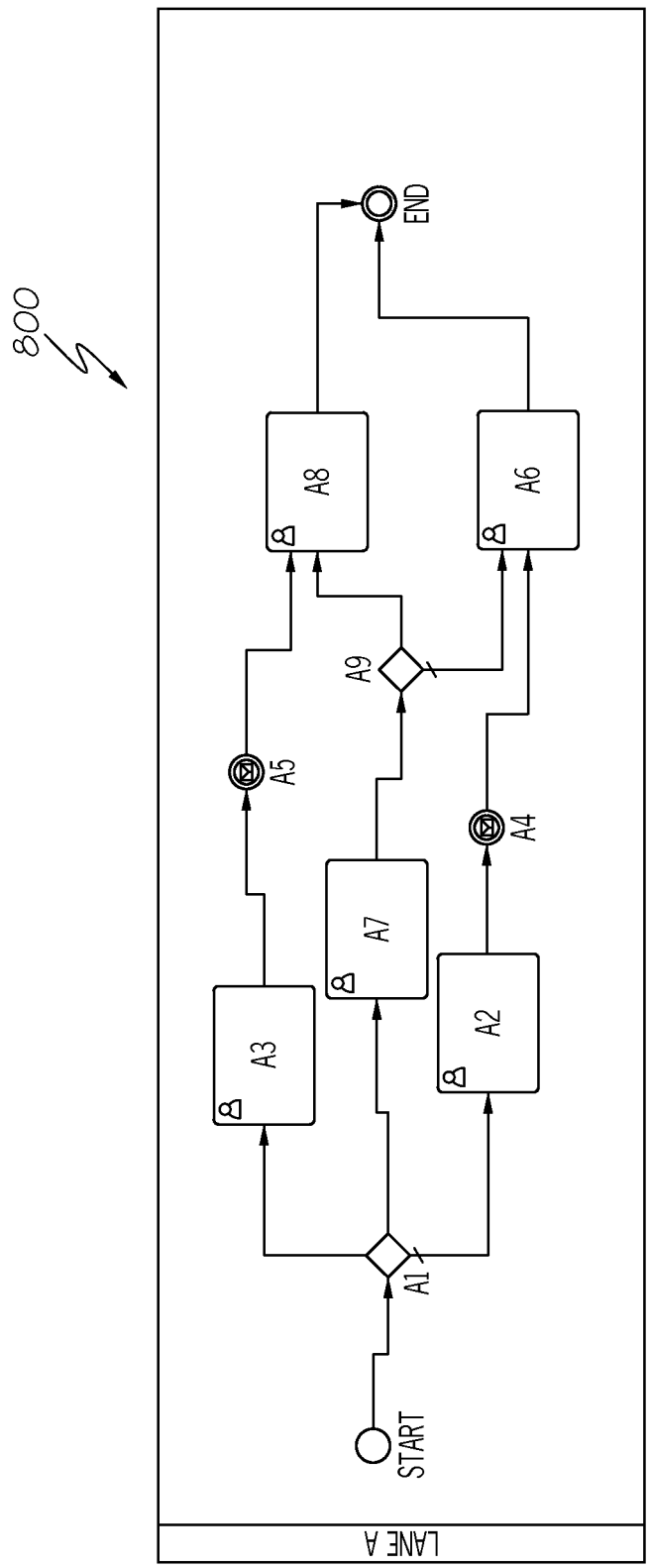
FIG. 8 illustrates the process diagram from FIG. 7 after lane-size reduction and additional auto-layout.

FIG. 7 shows the process diagram 600 as a process diagram 700 after auto-layout using the inventive steps described herein. The lane boundary is then reduced to approximately half of its original height, and auto-layout is performed again, resulting in the process diagram 800 shown in FIG. 8.

The process diagram 700 and the process diagram 800 are the result of the uniformly distributed input vector selection constrained by regional boundaries. The self-organizing algorithm described herein performs a balancing act between the tendency to want to fill the available space (due to random distribution of input vectors in the space) and the need to honor the constraints set by the network topology in order to minimize the distance between interconnected nodes.

It is also noted that the extension of the self-organizing algorithm include weight-constrained regions that effectively enabled the layout algorithm to handle layout space distribution independently within each region.

B. Cross-Regional Influences

One of the key goals of adding weight-constrained regions to the self-organizing network was to enable cross-regional influences that contribute to optimal global layout. To test this theoretical expectation, auto-layout is performed on various multi-lane diagram permutations in which nodes were interconnected across lanes. The algorithm showed an unexpected ability to effectively find optimal global layouts by locally accounting for cross-regional constraints in the form of node connections across lane boundaries.

Figure 9:
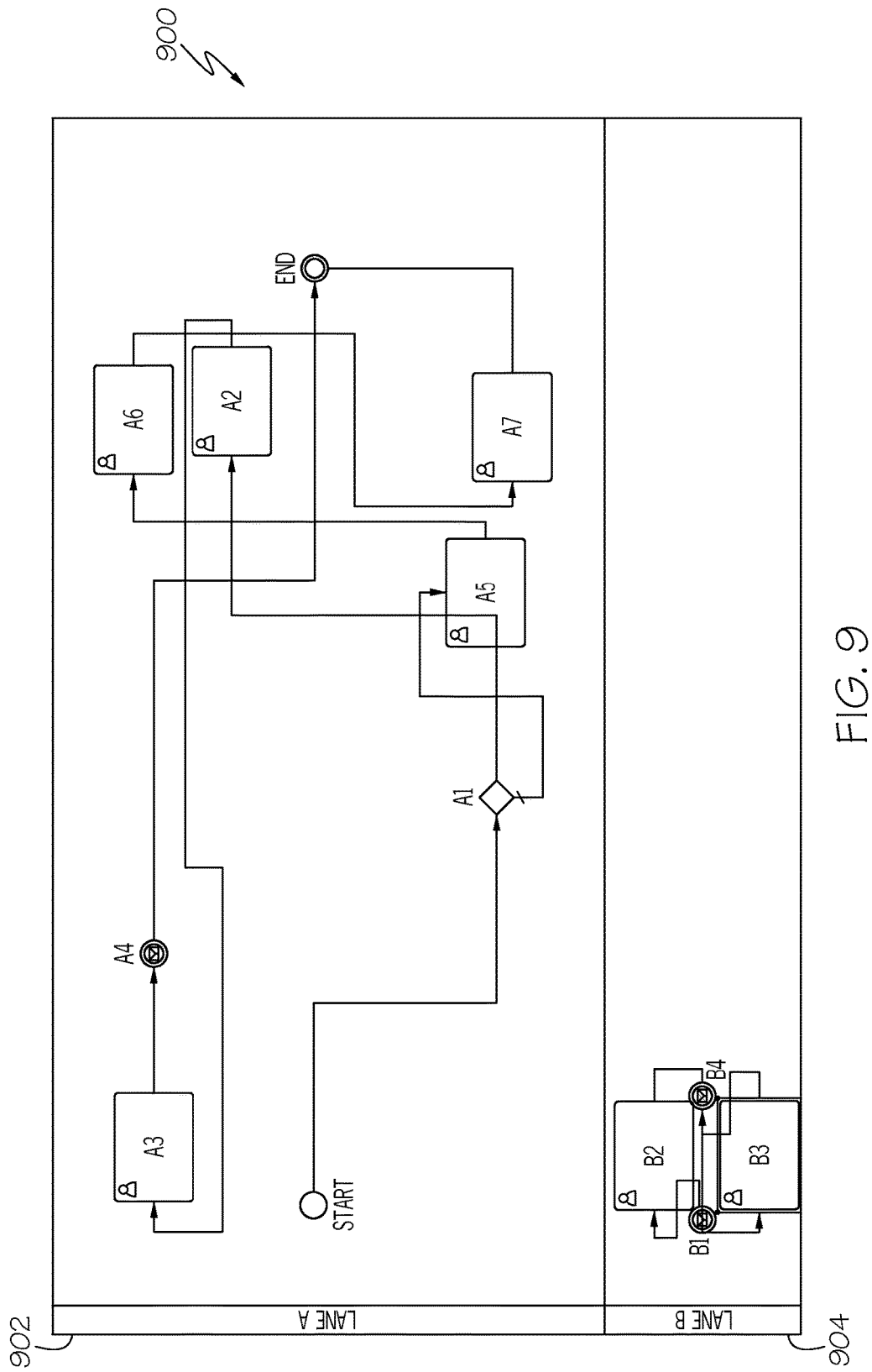
FIG. 9 depicts a 2-lane 13-node process diagram, with no connections between lanes, before auto-layout.
Figure 10:
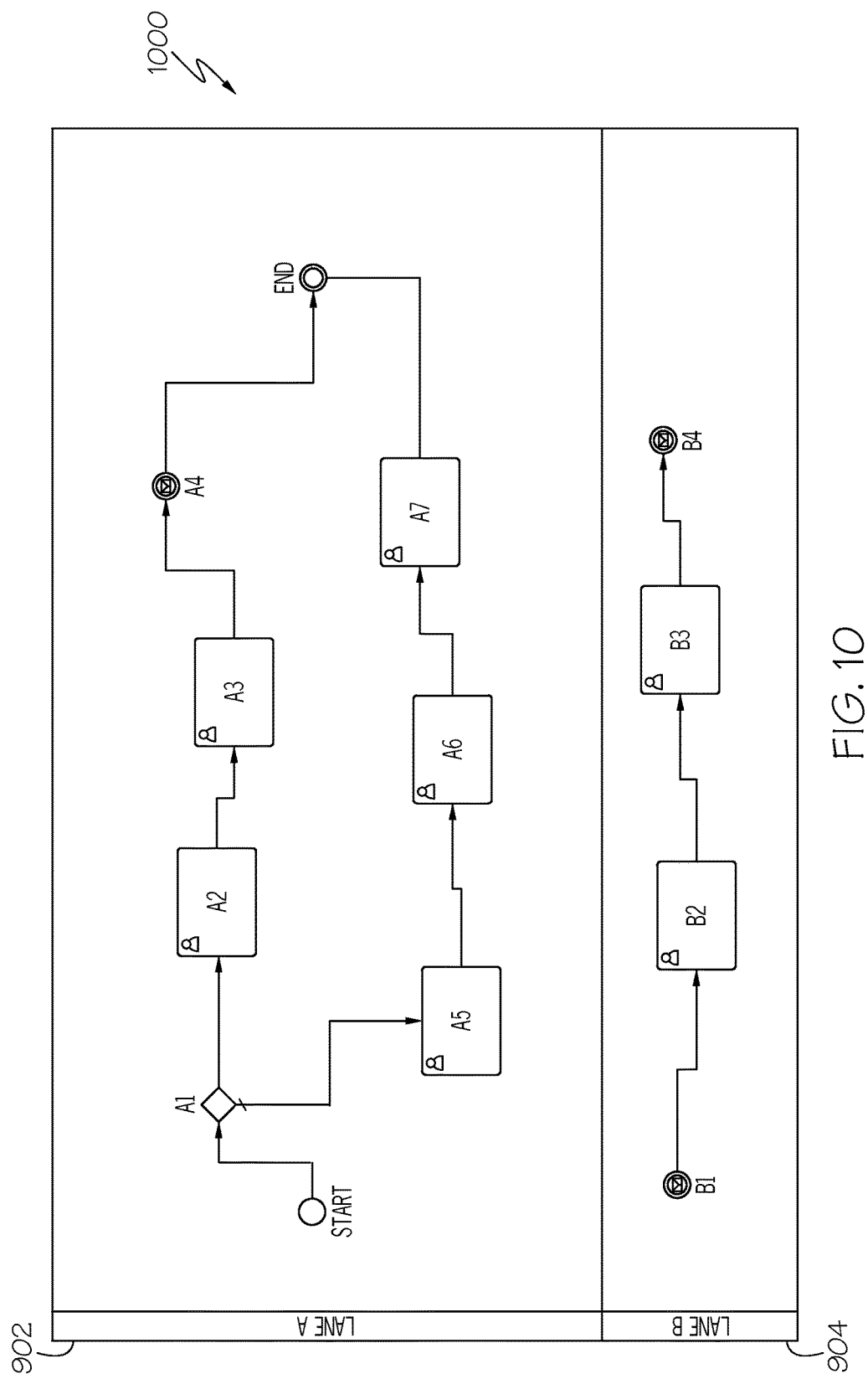
FIG. 10 illustrates the process diagram after auto-layout.

To illustrate, consider FIG. 9, which depicts a 2-lane process diagram 900 with separate and independent flows that do not cross lane boundaries. That is, one process is within lane 902, another process is within lane 904, and there is no process crossing between lane 902 and lane 904. During auto-layout, the separate regions are laid out independently in lane 902 and lane 904 with no influence on one another, as shown in the process diagram 1000 in FIG. 10.

Figure 11:
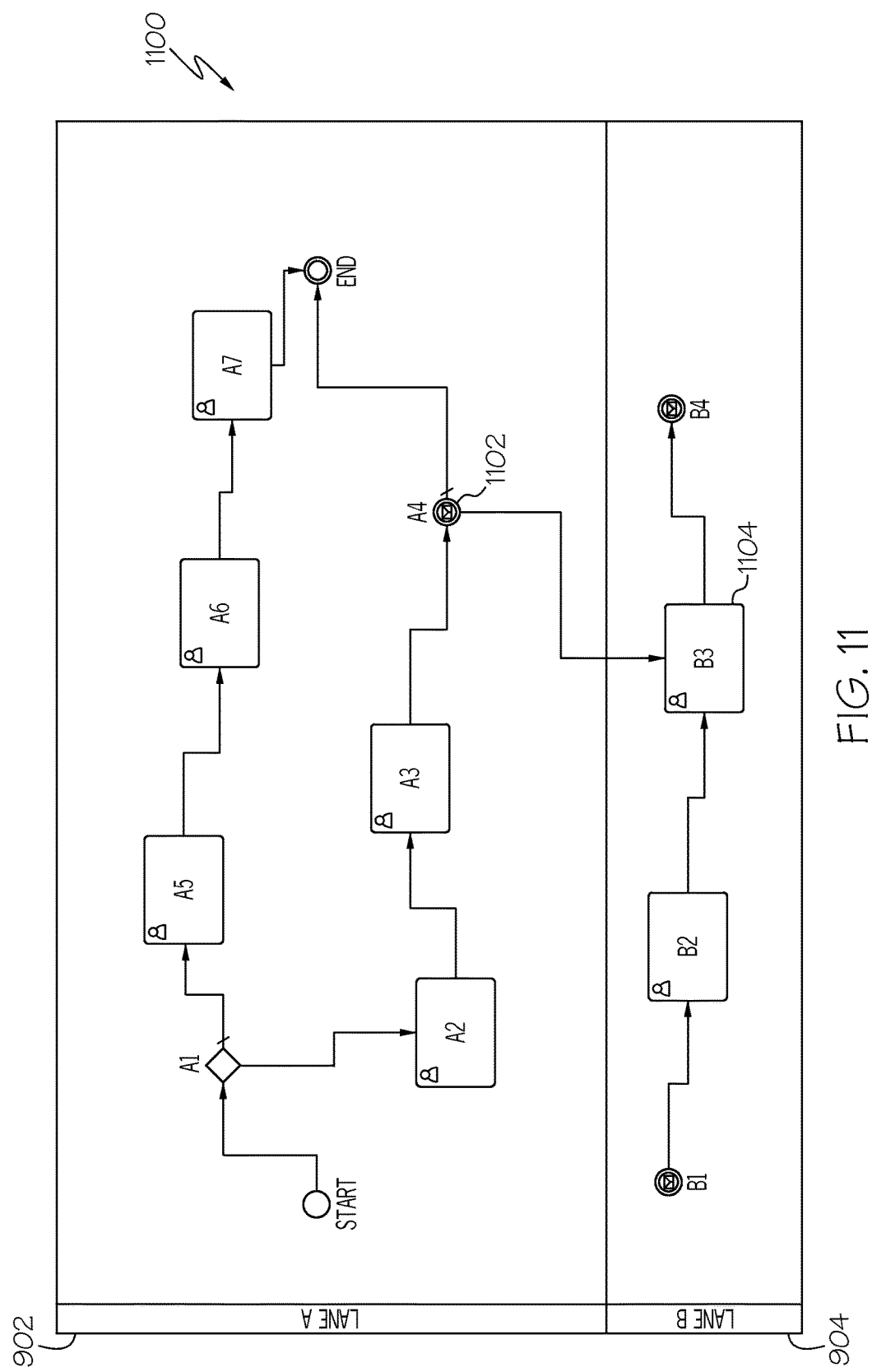
FIG. 11 depicts the process diagram in FIG. 10, in which a subsequent connection has been made between nodes in different swimlanes, after auto-layout.

However, when a connection is added between node A4 (node 1102) from lane 902 and node B3 (node 1104) from lane 904 as shown in FIG. 11, an auto-layout using the above described process is performed again. This results in the node structure in lane (lane 902) being flipped to account for the new constraint introduced by the connection (i.e., topographical proximity) between A4 (node 1102) and B3 (node 1104). Thus, FIG. 11 depicts a 2-lane 13-node process diagram, with a connection between the two lanes after auto-layout.

Figure 12:
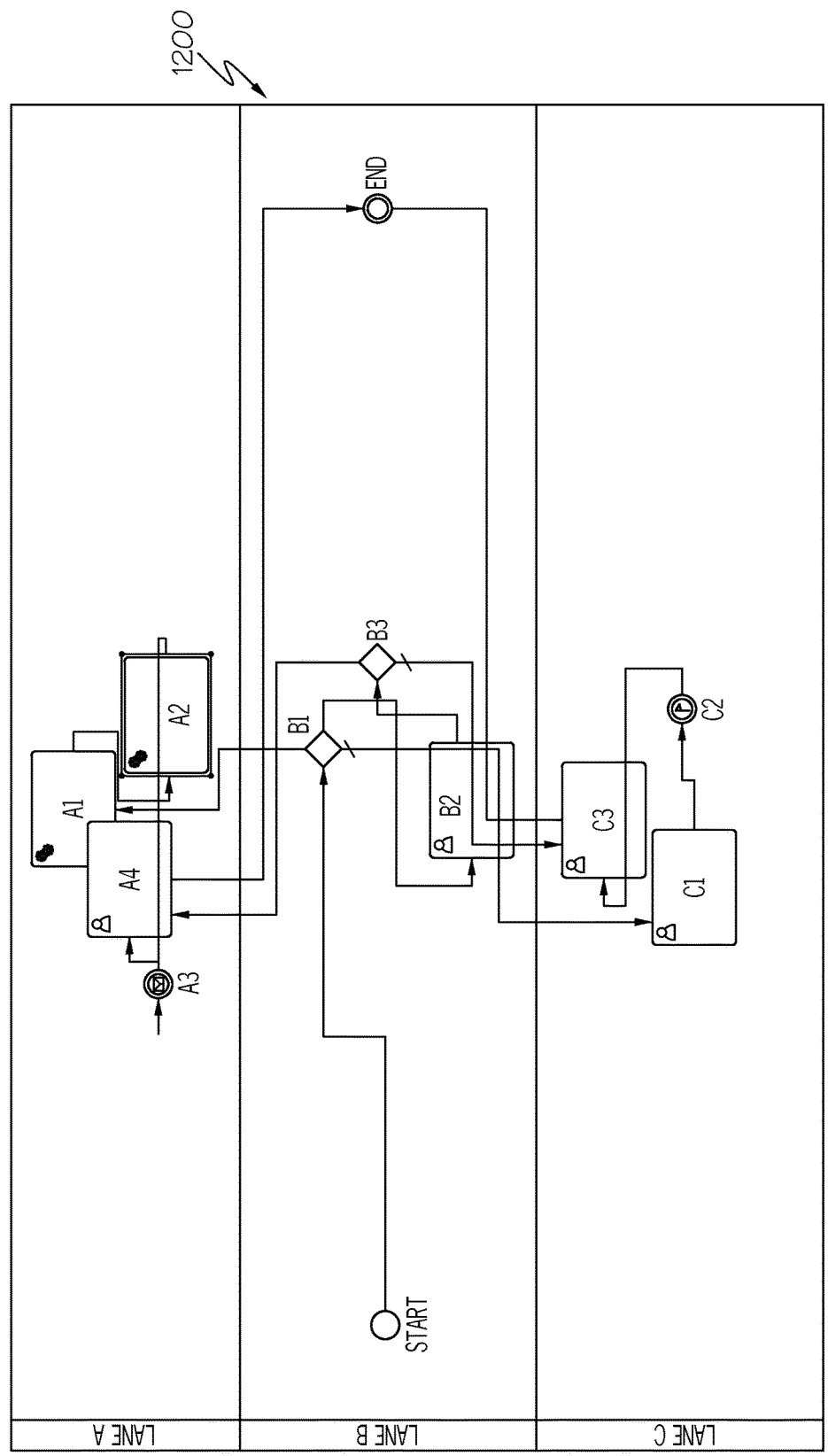
FIG. 12 illustrates a 3-lane 12-node process diagram, with multiple cross-lane connections, before auto-layout.
Figure 13:
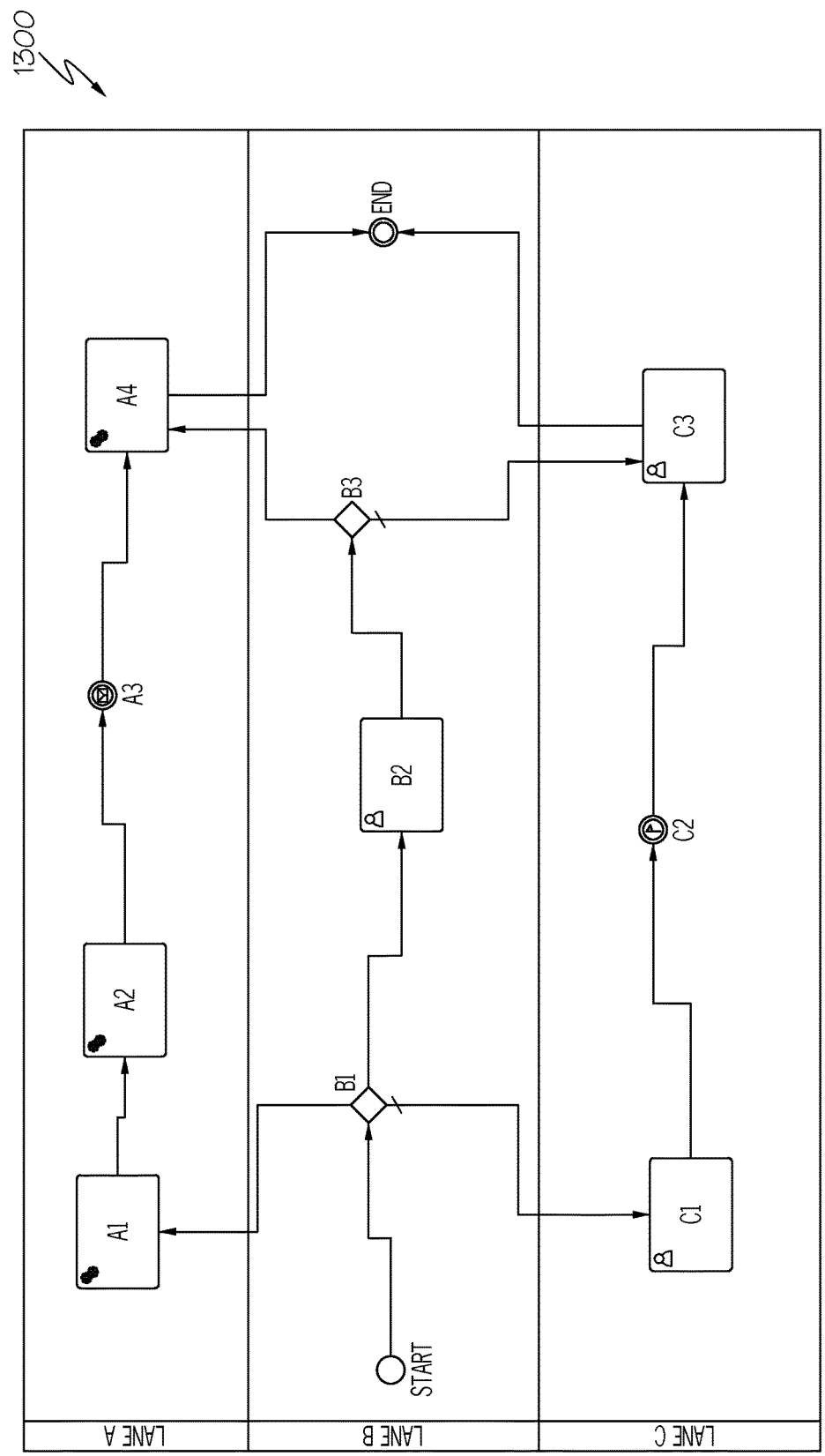
FIG. 13 depicts the process diagram from FIG. 12 after auto-layout.

For an example with a larger number of cross-lane connections, consider the transition of the process diagram 1200 in FIG. 12 when transformed, by the process described herein, into process diagram 1300 in FIG. 13. Note the symmetrical, globally optimized layout in process diagram 1300.

C. Flow Directionality

One purpose of immutable nodes being introduced into the self-organizing network is to provide a way to constrain the diagram layout and better reflect the directionality of flows. It is noted that designating all start and end event nodes as immutable succeeds as a natural directionality constraint.

Figure 14:
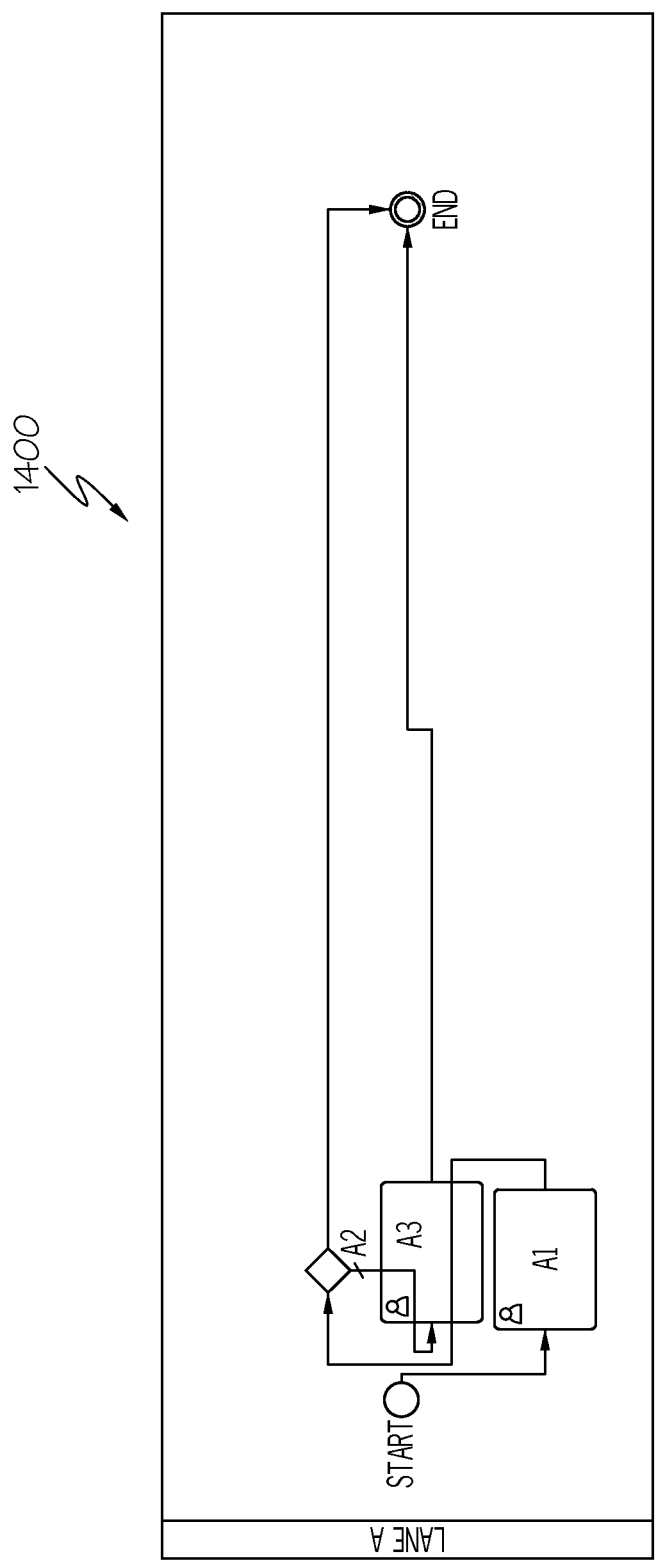
FIG. 14 illustrates a 1-lane 5-node process diagram before auto-layout.
Figure 15:
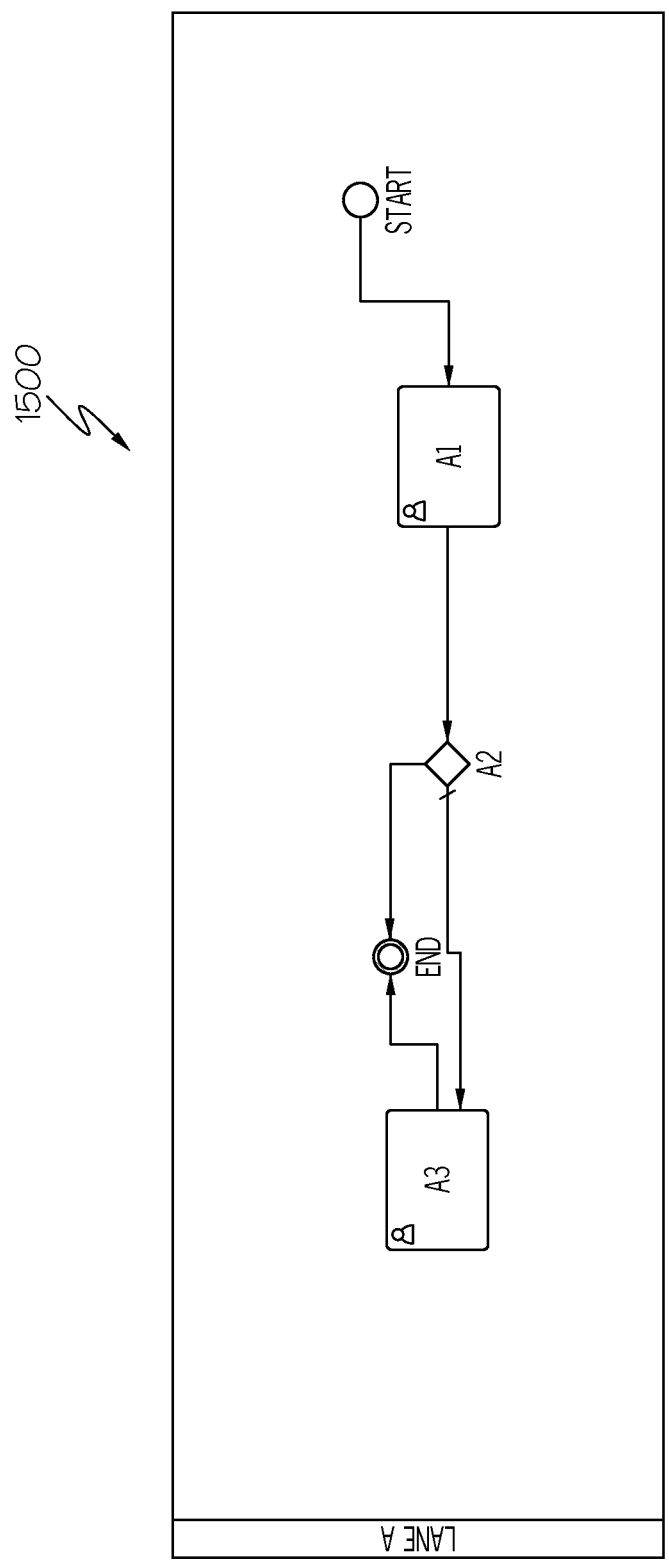
FIG. 15 depicts the process diagram from FIG. 14 after auto-layout with no immutable nodes.
Figure 16:
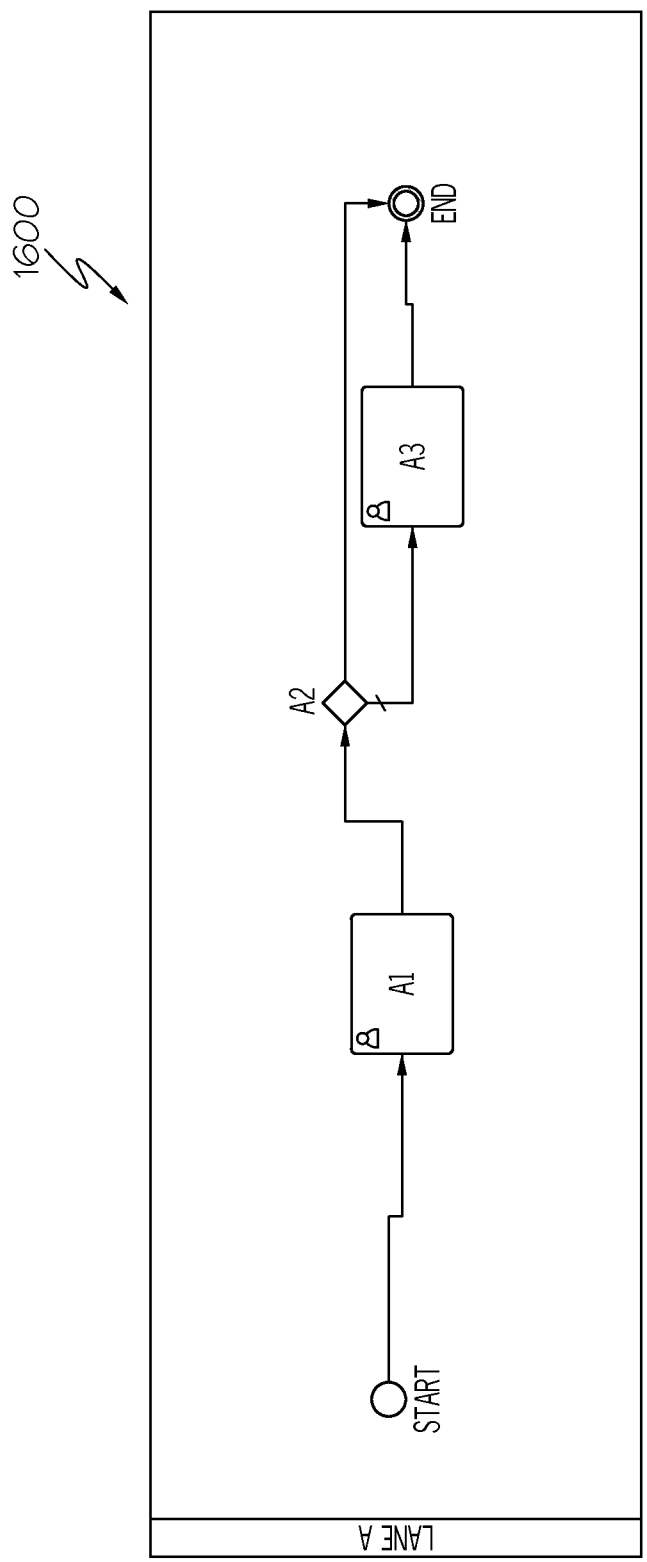
FIG. 16 illustrates the process diagram from FIG. 14 after auto-layout with immutable nodes.

Auto-layout runs have also been performed without the start-end immutable designation to capture the resulting layouts with those achieved with start/end immutability. The process diagrams 1200, 1300, and 1400 in respective FIGS. 12-14 show a sample run that illustrates the advantage of immutability.

D. Performance

To assess the execution time of the self-organizing layout algorithm, a series of performance tests has been performed. Highly interconnected test diagrams were created with a varying number of nodes (ranging from 10 to 50 nodes), distributed across a varying number of lanes (ranging from 1 to 5 lanes). Connections between nodes were maximized in the test diagrams to stress test the algorithm, which is naturally sensitive to topological proximity.

The performance test suite consisted of a set of tests for each specific number of nodes. Each set was initiated by creating a diagram with a single lane and the specific number of nodes. Five different auto-layout runs were then performed on the diagram, and the average execution time was calculated. The number of lanes was then increased, and the existing nodes were redistributed across the lanes. Then, the auto-layout five-run execution was repeated. This continued until five lanes were created. This was repeated multiple times with an incrementally increasing number of nodes.

Figure 17:
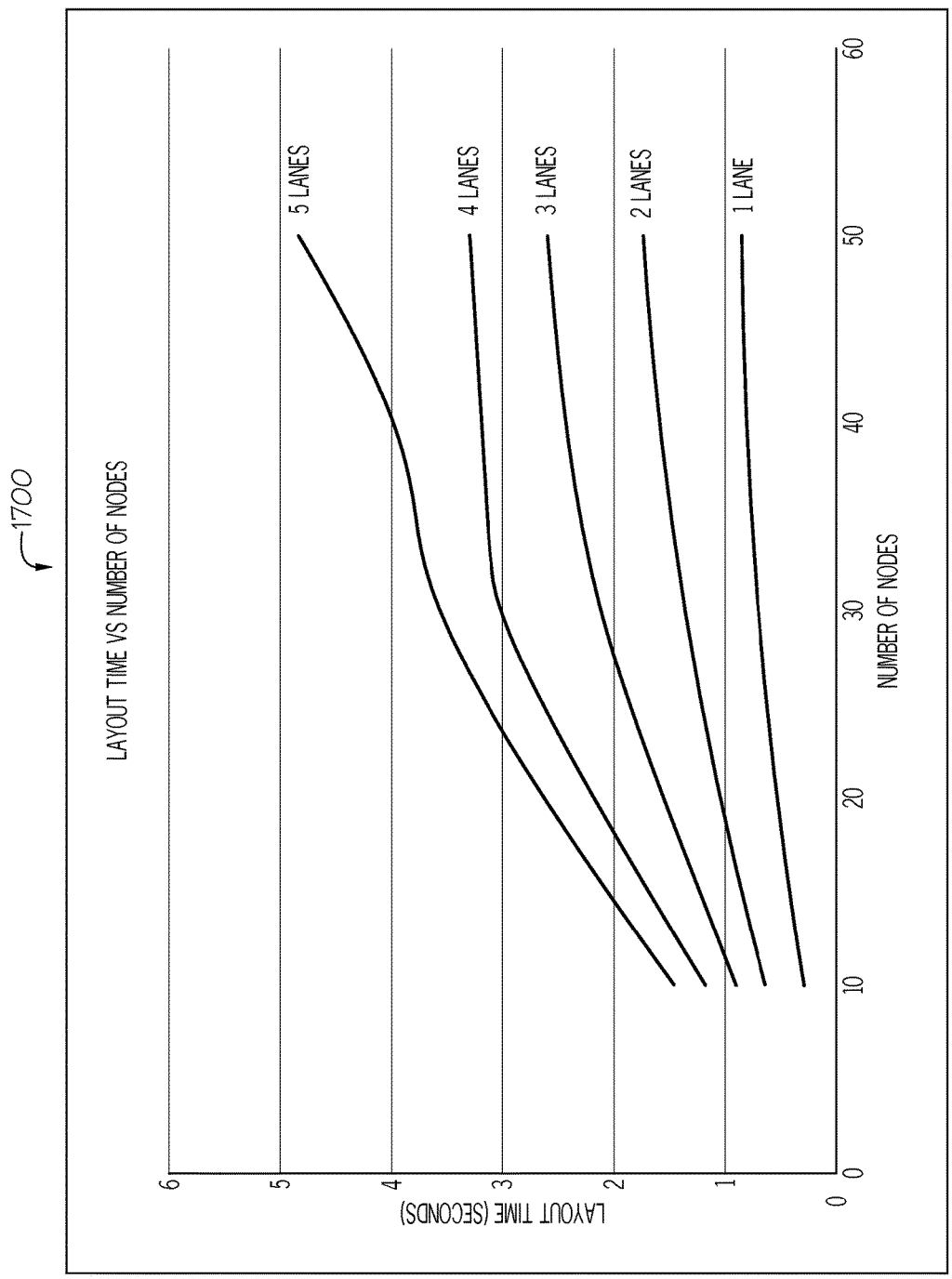
FIG. 17 depicts a performance chart showing results of performance tests on diagrams with a varying number of nodes distributed across a varying number of lines.

The performance test suite was executed on an Intel Xeon 3.47 GHz dual-processor system with 8 GB of RAM. The results are displayed in performance graph 1700 in FIG. 17, showing results of performance tests on diagrams with a varying number of nodes distributed across a varying number of lanes.

Single-lane diagrams showed the fastest execution time, with sub-second layout times. As more lanes were added, the execution time increased, since the algorithm(s) described herein treat each region of the diagram as a separate diagram with an independent set of input vectors. It took approximately 0.3 seconds to automatically lay out a diagram of 10 nodes in 1 lane and approximately 4.8 seconds to automatically lay out a diagram with 50 nodes distributed across 5 lanes.

Figure 18:
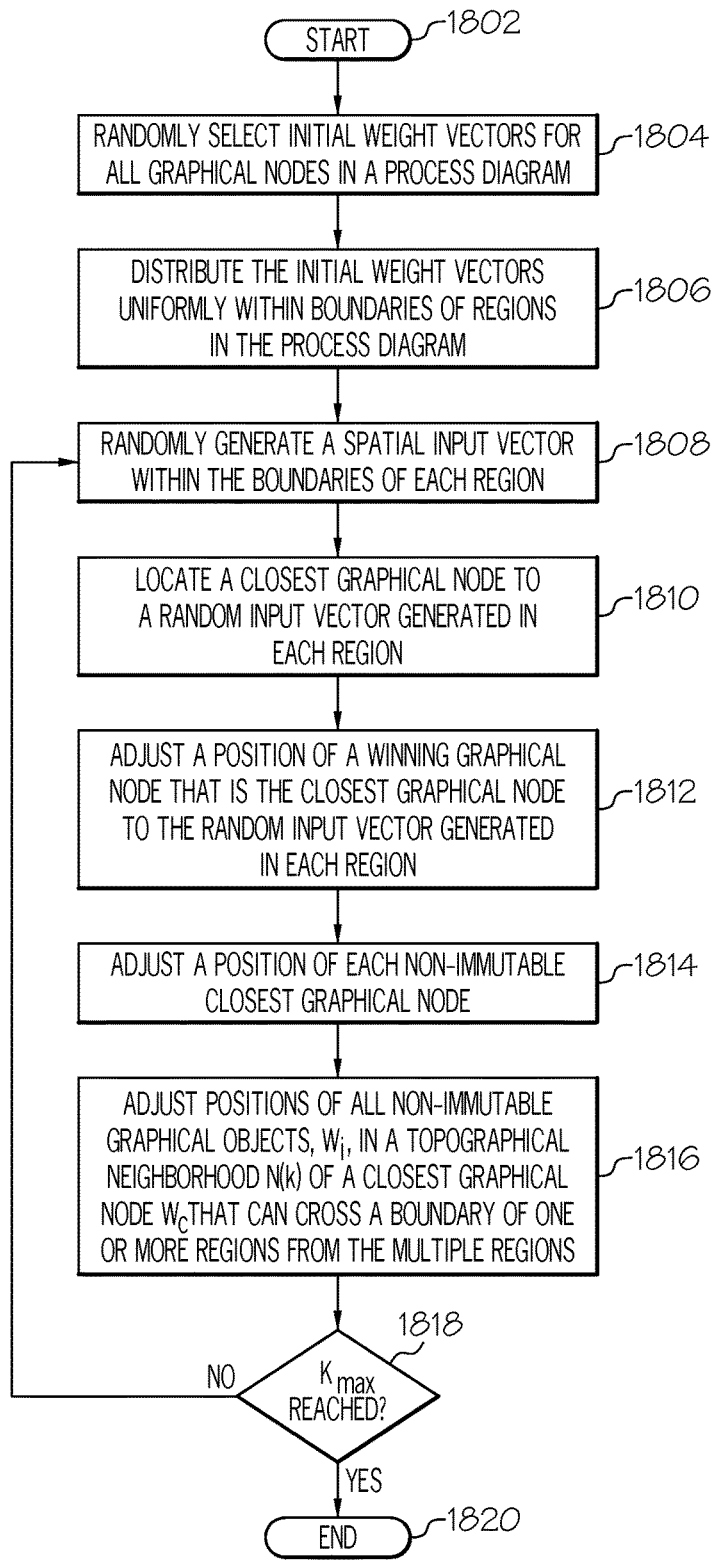
FIG. 18 is a high level flow-chart of one or more operations performed by one or more hardware devices to auto-layout a process diagram.

With reference now to FIG. 18, a high level flow-chart of one or more operations performed by one or more hardware devices to auto-layout a process diagram is presented.

After initiator block 1802, initial spatial position vectors, $w_i$, are randomly selected for all graphical nodes in a process diagram, as described in block 1804.

As described in block 1806, the initial spatial position vectors, $w_i$, are distributed uniformly within boundaries of regions in the process diagram;

As described in block 1808, in each region in the process diagram, a spatial input vector, x, is randomly within the boundaries of each region in the process diagram.

As described in block 1810, in each region in the process diagram, a closest graphical node, $w_c$, to a random input vector generated in said each region is found.

As described in block 1812, in each region in the process diagram, a position of a winning graphical node that is the closest graphical node to the random input vector generated in each region is adjusted.

As described in block 1814, the position of each non-immutable closest graphical node (i.e., the "winning node") is adjusted according to one or more algorithms described herein.

As described in block 1816, positions of all non-immutable graphical objects, $w_i$, in a topographical neighborhood N(k) of a closest graphical node $w_c$ that can cross a boundary of one or more regions from the multiple regions are then adjusted according to one or more algorithms described herein.

As determined in query block 1818, if a maximum number of iterations is not reached, then the processes described in blocks 1808-1816 are recursively performed.

The flow-chart ends at terminator block 1820.

In one embodiment of the present invention, the closest graphical node is determined by minimizing a Euclidean distance between x and $w_i$ such that:

$$\|x-w_c\|=\min_i \|x-w_i\|$$

In one embodiment of the present invention in which $w_c$ is not immutable, $w_c$ is from a set of non-immutable graphical nodes, $w_i$, in an interconnected neighborhood N(k), and nodes from $w_i$ can cross the regional boundaries in the process diagram, spatial adjustment of nodes in the process diagram is calculated one or more processor according to:

$$\Delta w_i = \alpha(k) h(n_c, n_i)[x-wi], \; n_i \epsilon N(k)$$

where $\alpha(k)$ is an adaption rate, having a value between 0 and 1, that diminishes with every iteration k; $h(n_c, n_i)$ is a neighborhood function, having a value between 0 and 1, that diminishes as a topographical distance increases between the winning node and other nodes $n_i$ in the neighborhood N(k)' and wherein N(k) defines a neighborhood boundary during an iteration k and decreases over a span of the iterations, such that $n_i \epsilon N(k)$ refers to every k iteration of output nodes n in the neighborhood N(k).

In one embodiment of the present invention, one or more processors determine $\alpha(k)$ $h(n_c, n_i)$ according to:

$$\alpha(k) = \alpha_{max} e^{-c\left(\frac{k}{k_{max}}\right)}$$

where $\alpha_{max}$ is a maximum adaption parameter (between 0 and 1), and c is a cooling parameter that determines the rate of decline in the adaption rate.

In one embodiment of the present invention, one or more processors further randomly generate the spatial input vector $x_i$, locate the closest graphical node $w_c$, and adjust the position of the immutable closest graphical node $w_c$, recursively until a weight adaption rate drops below a predefined threshold.

In one embodiment of the present invention, boundaries for each region R in the process diagram are set according one or more processors implementing an algorithm:

$$w_{i_{k+1}} = w_i + \Delta w_i = (w_{i_{k+1}x}, w_{i_{k+1}y})$$

such that:

if $w_{i_{k+1}x} > x_{max}^R$ then $w_{i_{k+1}x} = x_{max}^R$ if $w_{i_{k+1}x} < x_{min}^R$ then $w_{i_{k+1}x} = x_{min}^R$ if $w_{i_{k+1}y} > y_{max}^R$ then $w_{i_{k+1}y} = y_{max}^R$ if $w_{i_{k+1}y} < y_{min}^R$ then $w_{i_{k+1}y} = y_{min}^R$.

In one embodiment of the present invention, $w_c$ is determined by one or more processors implementing an algorithm:

$$h(n_c, n_i) = \begin{cases} \frac{1}{2^{d(n_c, n_i)}}, & n_i \in N(k) \\ 0, & n_i \notin N(k) \end{cases}$$

where $d(n_c, n_i)$ is a topographical (manhattan) distance between a winning node, $n_c$, and its neighboring node $n_i$ according to a number of connections in a shortest path between $n_c$ and $n_i$.

In one embodiment of the present invention, one or more processors characterize N(k) by a radius, r, where r denotes a maximum number of connections in a path between two nodes predetermined to be in a same neighborhood, and where r starts at a pre-selected $r_{max}$ and is reduced by 1 at a pre-selected $k_r$ interval, until r reaches a pre-selected $r_{min}$.

Figure 19:
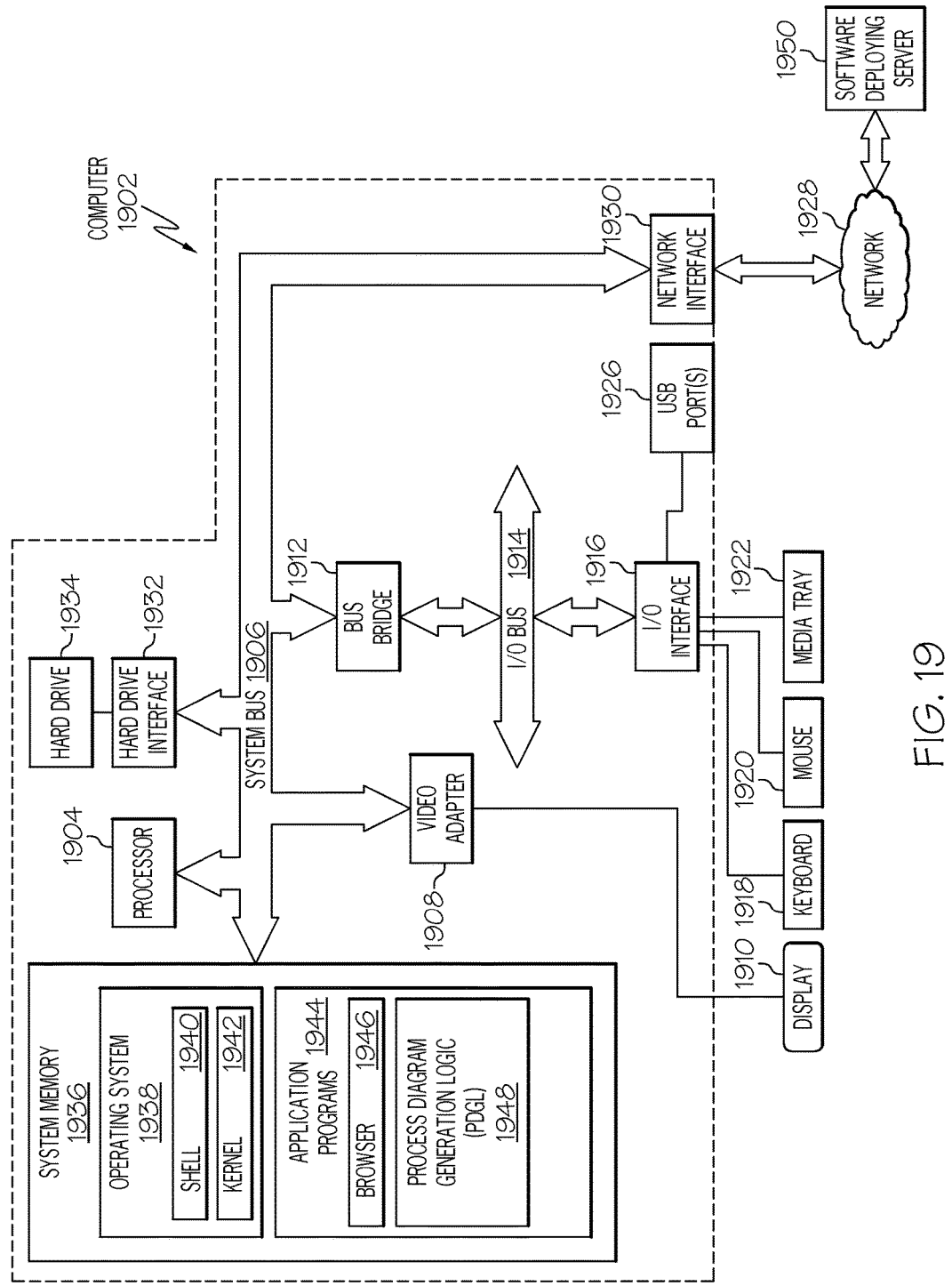
FIG. 19 depicts an exemplary system and network in which the present disclosure may be implemented.

With reference now to FIG. 19, there is depicted a block diagram of an exemplary system and network that may be utilized by and/or in the implementation of the present invention. Note that some or all of the exemplary architecture, including both depicted hardware and software, shown for and within computer 1902 may be utilized by software deploying server 1950.

Exemplary computer 1902 includes a processor 1904 that is coupled to a system bus 1906. Processor 1904 may utilize one or more processors, each of which has one or more processor cores. A video adapter 1908, which drives/supports a display 1910, is also coupled to system bus 1906. In one or more embodiments of the present invention, video adapter 1908 is a hardware video card. System bus 1906 is coupled via a bus bridge 1912 to an input/output (I/O) bus 1914. An I/O interface 1916 is coupled to I/O bus 1914. I/O interface 1916 affords communication with various I/O devices, including a keyboard 1918, a mouse 1920, a media tray 1922 (which may include storage devices such as CD-ROM drives, multi-media interfaces, etc.), and external USB port(s) 1926. While the format of the ports connected to I/O interface 1916 may be any known to those skilled in the art of computer architecture, in one embodiment some or all of these ports are universal serial bus (USB) ports.

As depicted, computer 1902 is able to communicate with a software deploying server 1950, using a network interface 1930. Network interface 1930 is a hardware network interface, such as a network interface card (NIC), etc. Network 1928 may be an external network such as the Internet, or an internal network such as an Ethernet or a virtual private network (VPN).

A hard drive interface 1932 is also coupled to system bus 1906. Hard drive interface 1932 interfaces with a hard drive 1934. In one embodiment, hard drive 1934 populates a system memory 1396, which is also coupled to system bus 1906. System memory is defined as a lowest level of volatile memory in computer 1902. This volatile memory includes additional higher levels of volatile memory (not shown), including, but not limited to, cache memory, registers and buffers. Data that populates system memory 1936 includes computer 1902's operating system (OS) 1938 and application programs 1944.

OS 1938 includes a shell 1940, for providing transparent user access to resources such as application programs 1944. Generally, shell 1940 is a program that provides an interpreter and an interface between the user and the operating system. More specifically, shell 1940 executes commands that are entered into a command line user interface or from a file. Thus, shell 1940, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1942) for processing. Note that while shell 1940 is a text-based, line-oriented user interface, the present invention will equally well support other user interface modes, such as graphical, voice, gestural, etc.

As depicted, OS 1938 also includes kernel 1942, which includes lower levels of functionality for OS 1938, including providing essential services required by other parts of OS 1938 and application programs 1944, including memory management, process and task management, disk management, and mouse and keyboard management.

Application programs 1944 include a renderer, shown in exemplary manner as a browser 1946. Browser 1946 includes program modules and instructions enabling a world wide web (WWW) client (i.e., computer 1902) to send and receive network messages to the Internet using hypertext transfer protocol (HTTP) messaging, thus enabling communication with software deploying server 1590 and other computer systems.

Application programs 1944 in computer 1902's system memory (as well as software deploying server 1950's system memory) also include a process diagram generation logic (PDGL) 1948. PDGL 1948 includes code for implementing the processes described below, including those described in FIGS. 1-18. In one embodiment, computer 1902 is able to download PDGL 1948 from software deploying server 1950, including in an on-demand basis, wherein the code in PDGL 1948 is not downloaded until needed for execution. Note further that, in one embodiment of the present invention, software deploying server 1950 performs all of the functions associated with the present invention (including execution of PDGL 1948), thus freeing computer 1902 from having to use its own internal computing resources to execute PDGL 1948.

Note that the hardware elements depicted in computer 1902 are not intended to be exhaustive, but rather are representative to highlight essential components required by the present invention. For instance, computer 1902 may include alternate memory storage devices such as magnetic cassettes, digital versatile disks (DVDs), Bernoulli cartridges, and the like. These and other variations are intended to be within the spirit and scope of the present invention.

VIII. CONCLUSION

By building on Kohonen's self-organizing network structure, adding to it the constructs of weight-constrained regions and immutable nodes, and inverting it into a weight-space interpretation, the present invention provides a new and useful self-organizing layout approach for Business Process Diagrams.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer program product for generating self-organizing layouts of process diagrams, the computer program product comprising a computer readable storage medium having program code embodied therewith, wherein the computer readable storage medium is not a transitory signal per se, and wherein the program code is readable and executable by a processor to perform a method comprising:

randomly selecting initial spatial position vectors, $w_i$, for all graphical nodes in a process diagram, wherein a first node in the process diagram is in a first lane of the process diagram, wherein a second node in the process diagram is in a second lane of the process diagram;

distributing the initial spatial position vectors, $w_i$, uniformly within boundaries of multiple regions in the process diagram;

in each region in the process diagram, randomly generating a spatial input vector, x, within the boundaries of each region;

in each region in the process diagram, finding a closest graphical node $w_c$, to a random input vector generated in said each region;

in each region in the process diagram, adjusting a position of a winning graphical node that is the closest graphical node to the random input vector generated in said each region, wherein said adjusting the position of the winning graphical node brings the winning graphical node closer to the random input vector;

adjusting a weight vector of each immutable closest graphical node in the process diagram, wherein each immutable closest graphical node $w_c$ has a fixed location on the process diagram;

adjusting positions of all non-immutable graphical objects in a topographical neighborhood N(k) of the closest graphical node $w_c$ that can cross a boundary of one or more regions from the multiple regions;

randomly generating the spatial input vector x, locating the closest graphical node $w_c$, adjusting the position of the winning graphical node, and adjusting positions of all non-immutable graphical objects in the topographical neighborhood N(k) recursively until a maximum number of iterations, $k_{max}$ is reached; and flipping an arrangement of nodes in the second lane such that the first node and the second node are proximate to one another and are connected by a connector that does not overlap any other connectors in the second lane.

2. The computer program product claim 1, wherein the closest graphical node $w_c$ is determined by:

minimizing a Euclidean distance between x and $w_i$, such that:

$$\|x-w_c\|=\min_i\|x-w_i\|.$$

3. The computer program product claim 1, wherein $w_c$ is not immutable, wherein $w_c$ is from a set of non-immutable graphical nodes, $w_c$, in an interconnected neighborhood N(k), wherein nodes from $w_c$ can cross the regional boundaries in the process diagram, and wherein spatial adjustment of nodes in the process diagram is calculated by:

$$\Delta w_i = \alpha(k)h(n_c,n_i)[x-w_i], \ n_i \in N(k)$$

where $\alpha(k)$ is an adaption rate, having a value between 0 and 1, that diminishes with every iteration k $h(n_c, n_i)$ is a neighborhood function, having a value between 0 and 1, that diminishes as a topographical distance increases between the winning graphical node and other nodes $n_i$ in the neighborhood N(k) and wherein N(k) defines a neighborhood boundary during an iteration k and decreases over a span of the iterations, such that $n_i \in N(k)$ refers to every k iteration of output nodes n in the neighborhood N(k).

4. The computer program product claim 3, wherein the method further comprises:

determining $\alpha(k) \ h(n_c, n_i)$:

$$\alpha(k) = \alpha_{max} e^{-c\left(\frac{k}{k_{max}}\right)}$$

where $\alpha_{max}$ is a maximum adaption parameter (between 0 and 1), and c is a cooling parameter that determines a rate of decline in the adaption rate.

5. The computer program product claim 1, wherein the method further comprises:
recursively randomly generating the spatial input vector x, locating the closest graphical node $w_c$, and adjusting the position of the closest graphical node $w_c$, until a weight adaption rate drops below a predefined threshold.

6. The computer program product claim 1, wherein the method further comprises setting boundaries for each region R in the process diagram by implementing an algorithm:

$$w_{i_{k+1}} = w_i + \Delta w_i = (w_{i_{k+1}x}, w_{i_{k+1}y})$$

such that:

if $w_{i_{k+1}x} > x_{max}^R$ then $w_{i_{k+1}x} = x_{max}^R$ if $w_{i_{k+1}x} < x_{min}^R$ then $w_{i_{k+1}x} = x_{min}^R$ if $w_{i_{k+1}y} > y_{max}^R$ then $w_{i_{k+1}y} = y_{max}^R$ if $w_{i_{k+1}y} < y_{min}^R$ then $w_{i_{k+1}y} = y_{min}^R$.

7. The computer program product claim 1, wherein the method further comprises determining $w_c$, by implementing an algorithm:

$$h(n_c, n_i) = \begin{cases} \frac{1}{2^{d(n_c,n_i)}}, & n_i \in N(k) \\ 0, & n_i \notin N(k) \end{cases}$$

where $d(n_c, n_i)$ is a topographical manhattan distance between a winning node, $n_c$, and its neighboring node $n_i$ according to a number of connections in a shortest path between $n_c$ and $n_i$.

8. The computer program product claim 1, wherein the method further comprises:
characterizing N(k) by a radius, r, wherein r denotes a maximum number of connections in a path between two nodes predetermined to be in a same neighborhood, wherein r starts at a pre-selected $r_{max}$ and is reduced by 1 at a pro-selected $k_r$ interval, until r reaches a pro-selected $r_{min}$.

9. A system comprising:
a processor, a computer readable memory, and a non-transitory computer readable storage media;
first program instructions to randomly select initial spatial position vectors, $w_i$, for all graphical nodes in a process diagram, wherein a first node in the process diagram is in a first lane of the process diagram, wherein a second node in the process diagram is in a second lane of the process diagram;
second program instructions to distribute the initial spatial position vectors, $w_i$, uniformly within boundaries of multiple regions in the process diagram;
third program instructions to, in each region in the process diagram, randomly generate a spatial input vector, x, within the boundaries of each region;
fourth program instructions to, in each region in the process diagram, find a closest graphical node, $w_c$, to a random input vector generated in said each region;
fifth program instructions to, in each region in the process diagram, adjust a position of a winning graphical node that is the closest graphical node to the random input vector generated in said each region, wherein adjusting the position of the winning graphical node brings the winning graphical node closer to the random input vector;
sixth program instructions to adjust a weight vector of each immutable closest graphical node in the process diagram, wherein each immutable closest graphical node $w_c$ has a fixed location on the process diagram;
seventh program instructions to adjust positions of all non-immutable graphical objects in a topographical neighborhood N(k) of the closest graphical node $w_c$ that can cross a boundary of one or more regions from the multiple regions; and
eighth program instructions to randomly generate the spatial input vector x, locate the closest graphical node $w_c$, adjust the position of the winning graphical node, and adjust positions of all non-immutable graphical objects in the topographical neighborhood N(k) recursively until a maximum number of iterations, $k_{max}$ is reached; and
ninth program instructions to flip an arrangement of nodes in the second lane such that the first node and the second node are proximate to one another and are connected by a connector that does not overlap any other connectors in the second lane; and wherein
the first, second, third, fourth, fifth, sixth, seventh, eighth, and ninth program instructions are stored on the non-transitory computer readable storage media for execution by the processor via the computer readable memory.

10. The system of claim 9, further comprising:
tenth program instructions to determine the closest graphical node by minimizing a Euclidean distance between x and $w_i$, such that:

$$\|x-w_c\|=\min_i\|x-w_i\|$$

wherein the tenth program instructions are stored on the non-transitory computer readable storage media for execution by the processor via the computer readable memory.

11. The system of claim 9, wherein $w_c$ is not immutable, wherein $w_c$ is from a set of non-immutable graphical nodes, $w_c$, in an interconnected neighborhood N(k), wherein nodes from $w_c$ can cross the regional boundaries in the process diagram, and wherein the system further comprises:
tenth program instructions to calculate spatial adjustment of nodes in the process diagram by executing the formula:

$$\Delta w_i = \alpha(k) h(n_c, n_i)[x-wi], n_i \in N(k)$$

where $\alpha(k)$ is an adaption rate, having a value between 0 and 1, that diminishes with every iteration k; $h(n_c, n_i)$ is a neighborhood function, having a value between 0 and 1, that diminishes as a topographical distance increases between the winning graphical node and other nodes $n_i$ in the neighborhood N(k) and wherein N(k) defines a neighborhood boundary during an iteration k and decreases over a span of the iterations, such that $n_i \in N(k)$ refers to every k iteration of output nodes n in the neighborhood N(k); and
eleventh program instructions to determine $\alpha(k) h(n_c, n_i)$ by executing the formula:

$$\alpha(k) = \alpha_{max} e^{-c\left(\frac{k}{k_{max}}\right)}$$

where $\alpha_{max}$ is a maximum adaption parameter, having a value between 0 and 1, and c is a cooling parameter that determines a rate of decline in the adaption rate; and wherein the tenth and eleventh program instructions are stored on the non-transitory computer readable storage media for execution by the processor via the computer readable memory.

12. The system of claim 9, further comprising:
tenth program instructions to recursively randomly generate the spatial input vector x, locate the closest graphical node $w_c$, and adjust the position of the closest graphical node $w_c$, until a weight adaption rate drops below a predefined threshold; and wherein
the tenth program instructions are stored on the non-transitory computer readable storage media for execution by the processor via the computer readable memory.

\* \* \* \* \*